United States Patent
Yang et al.

(10) Patent No.: US 12,215,272 B2
(45) Date of Patent: Feb. 4, 2025

(54) HEAT TRANSFER FLUIDS AND CORROSION INHIBITOR FORMULATIONS FOR USE THEREOF

(71) Applicant: PRESTONE PRODUCTS CORPORATION, Danbury, CT (US)

(72) Inventors: Bo Yang, Ridgefield, CT (US); Peter M. Woyciesjes, Danbury, CT (US)

(73) Assignee: Prestone Products LLC, Wilmington, DE (US)

( * ) Notice: Subject to any disclaimer, the term of this patent is extended or adjusted under 35 U.S.C. 154(b) by 760 days.

(21) Appl. No.: 17/437,217

(22) PCT Filed: Mar. 6, 2020

(86) PCT No.: PCT/US2020/021523
§ 371 (c)(1),
(2) Date: Sep. 8, 2021

(87) PCT Pub. No.: WO2020/185611
PCT Pub. Date: Sep. 17, 2020

(65) Prior Publication Data
US 2022/0169906 A1 Jun. 2, 2022

Related U.S. Application Data

(60) Provisional application No. 62/815,747, filed on Mar. 8, 2019.

(51) Int. Cl.
| C09K 5/20 | (2006.01) |
| C09K 15/30 | (2006.01) |
| C23F 11/14 | (2006.01) |
| H01M 8/04029 | (2016.01) |
| H01M 8/04701 | (2016.01) |

(52) U.S. Cl.
CPC ............... C09K 5/20 (2013.01); C09K 15/30 (2013.01); C23F 11/149 (2013.01); H01M 8/04029 (2013.01); H01M 8/04701 (2013.01)

(58) Field of Classification Search
CPC .......... H01M 8/04029; H01M 8/04701; C23F 11/149; C09K 5/20; C09K 15/30
See application file for complete search history.

(56) References Cited

U.S. PATENT DOCUMENTS

| 5,741,436 A | 4/1998 | Gershun et al. |
| 8,617,415 B2 | 12/2013 | Yang et al. |
| 8,617,416 B1 | 12/2013 | Yang et al. |
| 8,696,927 B2 | 4/2014 | Yang et al. |
| 9,145,613 B2 | 9/2015 | Yang et al. |
| 10,160,895 B2 | 12/2018 | Kodama et al. |
| 2009/0266519 A1 | 10/2009 | Marinho et al. |
| 2010/0059703 A1 | 3/2010 | Yang et al. |
| 2012/0270129 A1 | 10/2012 | Marinho et al. |
| 2014/0070134 A1 | 3/2014 | Woyciesjes et al. |
| 2016/0017200 A1 | 1/2016 | Yang et al. |
| 2016/0257868 A1 | 9/2016 | Yang et al. |
| 2018/0208877 A1 | 7/2018 | Mathews |

FOREIGN PATENT DOCUMENTS

| CN | 102149785 | 8/2011 |
| CN | 102272260 | 12/2011 |
| CN | 104822794 | 8/2015 |
| CN | 104884564 | 9/2015 |
| JP | 2011-513552 | 4/2011 |
| RU | 2170752 | 7/2001 |
| RU | 2664511 | 8/2018 |
| RU | 2678036 | 1/2019 |
| WO | 01/070900 | 9/2001 |

OTHER PUBLICATIONS

Search Report and Written Opinion issued in Appl. No. PCT/US2020/021523 (2020).
English translation of Office Action issued in CN202080033882.5 (Jan. 23, 2024).
English translation of Office Action issued in JP2021-553016 (Nov. 30, 2023).
Office Action issued in CA3132478 (Dec. 19, 2023).
Extended Search Report issued in Appl. No. EP 20770876.9 (Oct. 22, 2022).
English translation of Office Action issued in BR112021017698-7 (Nov. 7, 2023).
English translation of First Office Action issued in CN202080033882.5 (Sep. 21, 2023).
English translation of Office Action issued in RU2021129251 (Sep. 23, 2023).
English translation of Office Action issued in KR10-2021-7031328 (Jun. 13, 2024).
Examination Report issued in EP 20770876.9 (Sep. 19, 2024).

*Primary Examiner* — Sarah A. Slifka
(74) *Attorney, Agent, or Firm* — Barnes & Thornburg LLP; G. Peter Nichols

(57) ABSTRACT

Heat transfer fluid concentrates include: (a) a freezing point depressant; and (b) a non-ionic surfactant comprising (i) a corrosion inhibitor for copper and copper alloys and (ii) a polyalkylene glycol. A conductivity of the heat transfer fluid concentrate is less than or equal to about 100 S/cm. Ready-to-use heat transfer fluids and methods for preventing corrosion in heat transfer systems are described.

45 Claims, 3 Drawing Sheets

HEAT TRANSFER FLUIDS AND CORROSION INHIBITOR FORMULATIONS FOR USE THEREOF

CROSS REFERENCE TO RELATED APPLICATIONS

This application is a U.S. nationalization under 35 U.S.C. § 371 of International Application No. PCT/US2020/021523, filed Mar. 6, 2020, which claims the benefit of priority under 35 U.S.C. § 119 (e) to U.S. Provisional Patent Application No. 62/815,747, filed 8 Mar. 2019. The disclosures set forth in the referenced applications are incorporated herein by reference in their entireties.

TECHNICAL FIELD

The present teachings relate generally to heat transfer fluids and, in some embodiments, to heat transfer fluids for inhibiting corrosion in heat transfer systems.

BACKGROUND

Heat transfer systems in thermal communication with a power source are used to regulate heat generated during the operation of the power source. For example, automotive vehicles employ heat transfer fluids and cooling systems that transfer and dissipate heat generated as a by-product of gasoline powered internal combustion engines.

Alternative power sources such as batteries, fuel cells, solar photovoltaic cells, and internal combustion engines powered by the condensation of steam, natural gas, diesel, hydrogen, and/or the like may also utilize heat transfer systems and heat transfer fluids to maintain optimum operating conditions, particularly with regards to temperature.

Conventional internal combustion cooling systems and heat transfer fluids may not be suitable and/or optimal for use with alternative power sources, particularly those employing electricity or an electrical charge. For example, conventional heat transfer fluids are typically characterized by having extremely high electrical conductivities, often in the range of 3000 μS/cm or more. The use of highly electrically conductive heat transfer fluids with alternative power sources-especially electricity-based alternative power sources—may result in electrical shock, increased corrosion, and/or the short-circuiting of electrical current.

SUMMARY

The scope of the present invention is defined solely by the appended claims, and is not affected to any degree by the statements within this summary.

By way of introduction, a heat transfer fluid concentrate in accordance with the present teachings for use in a heat transfer fluid includes: (a) a freezing point depressant; and (b) a non-ionic surfactant comprising (i) a corrosion inhibitor for copper and copper alloys and (ii) a polyalkylene glycol. A conductivity of the heat transfer fluid concentrate is less than or equal to about 100 μS/cm.

A heat transfer fluid in accordance with the present teachings includes: (a) water; (b) a freezing point depressant in an amount of about 10 wt. % to about 99.85 wt. % based on a total weight of the heat transfer fluid; and (c) a non-ionic surfactant in an amount of about 0.001 wt. % to about 2 wt. % based on a total weight of the heat transfer fluid. The non-ionic surfactant includes (i) an azole compound and (ii) a polyalkylene glycol. A conductivity of the heat transfer fluid concentrate is less than or equal to about 50 μS/cm.

A method in accordance with the present teachings for preventing corrosion in a heat transfer system includes contacting at least a portion of the heat transfer system with a heat transfer fluid of a type described above.

DETAILED DESCRIPTION

Figure 1:
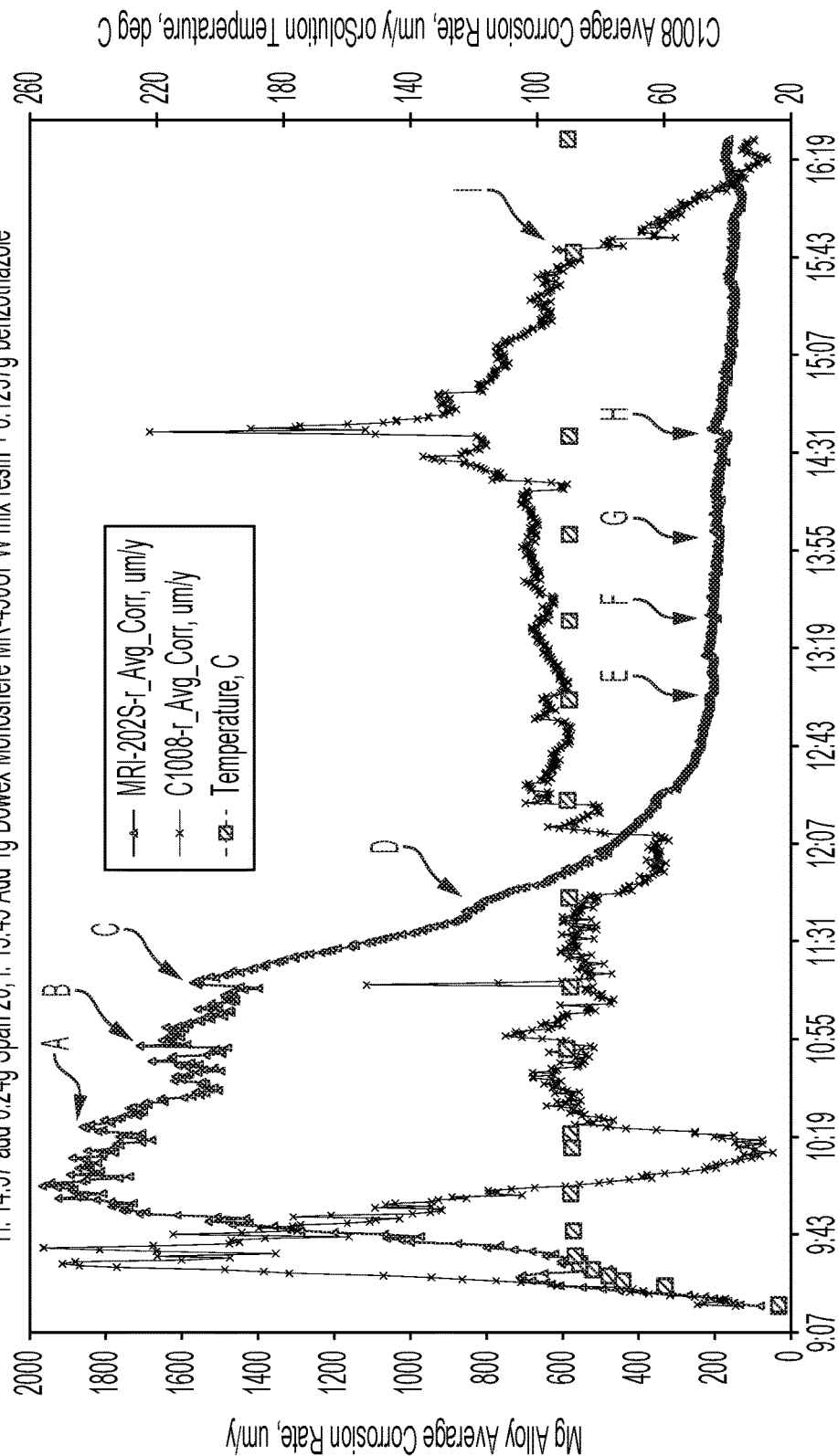
FIG. 1 shows a plot of average corrosion rate versus time in a first example demonstrating the effect of corrosion inhibitor additions.

In accordance with the present teachings, heat transfer fluid concentrates and ready-to-use heat transfer fluids derived from heat transfer fluid concentrates (e.g., by dilution with water) that (a) have low electrical conductivity, (b) provide effective heat transfer, (c) provide excellent corrosion protection of cooling system metals (including but not limited to magnesium and magnesium alloys), (d) protect against freezing and boil-over, (e) have low foam tendency, and/or (f) are in compliance with the applicable ASTM D3306 requirements (or the corresponding automaker's coolant specifications for electric vehicles) have been discovered and are described herein. In accordance with the present teachings, low conductivity or non-conductive corrosion-inhibited glycol/water-based compositions may be used as coolants for vehicle cooling systems. In some embodiments, the conductivity of the coolants is less than about 100 μS/cm, in some embodiments less than about 25 μS/cm, and in some embodiments less than about 10 μS/cm. In some embodiments, to prevent depletion of the corrosion inhibitor and/or colorant and to maintain the coolant conductivity at low levels during vehicle operation, heat transfer fluid concentrates and heat transfer fluids derived therefrom may use an inhibitor and/or colorant pre-treated ion exchange resin to remove undesirable ionic species from the coolant.

By way of general introduction, a fuel cell is an electrochemical device that generates electricity from the electrochemical reaction between a fuel, such as hydrogen, and an oxidant, such as oxygen. Water is generally produced as a byproduct of this electrochemical reaction. Fuel cells are clean and efficient power sources that may be used to replace the internal combustion engine of a conventional automobile. A fuel cell assembly typically includes an anode (a negatively-charged electrode where the oxidation reaction of a fuel takes place), a cathode (a positively-charged electrode where the reduction of an oxidant—for example, oxygen-takes place), and an electrolyte interposed between the two electrodes. To produce sufficient power for use in a vehicle engine, a fuel cell-based engine may include many fuel cells connected in series together to form a fuel cell stack. Each single cell may operate at a voltage of 0.6-1.0V DC. A fuel cell stack for use in a vehicle may have more than 100 cells connected in series. Thus, the DC electrical voltage across the fuel cell stack can be very high. Typical cell voltage may range from about 125 V to about 450V DC in an automotive fuel cell stack.

In addition to generating electric power, a fuel cell assembly also generates heat due to the exothermic nature of the electrochemical reactions involved and the flow of electrical current. Thus, a fuel cell stack may also contain coolant channels for the circulation of coolant to remove heat from the stack. In circulating a coolant through the coolant channels, the temperature of the fuel cell stack may be controlled at the desirable range for optimal operating conditions.

The cooling system surrounding a fuel cell stack is exposed to the same electrical voltage as the fuel cell stack itself. Thus, to prevent or minimize electrical shock, the coolant must have very low conductivity. For example, the upper limit for coolant conductivity may be set to less than about 5 μS/cm. Low electrical conductivity for fuel cell coolant may also be desirable for reducing the shunt current in the coolant system and minimizing system efficiency reduction.

Fuel cell coolant systems may have many metallic components. By way of example, stainless steel, aluminum, aluminum alloy, magnesium, magnesium alloy, brass and braze alloy, yellow metal, and other ferrous or non-ferrous alloys may be included in a fuel cell coolant system. Since these metals may be susceptible to corrosion under operating conditions, corrosion inhibitors may be needed in the fuel cell coolant in order to minimize corrosion and increase system service life. However, most conventional corrosion inhibitors are ionic species (e.g., silicates, nitrites, molybdates, nitrates, carboxylates, phosphates, borates, etc.). As such, using these ionic corrosion inhibitors at the sufficiently high concentrations that are typically used to provide corrosion protection in an engine cooling system may result in the fuel cell coolant conductivity limits being greatly exceeded. Thus, providing effective corrosion protection for metals in a fuel cell coolant system-particularly though not exclusively metals that are more prone to corrosion, such as carbon steel, aluminum alloys, magnesium alloys, and yellow metals—is a major challenge. The ability to protect against corrosion of metals in the cooling systems of a fuel cell-powered vehicle may facilitate the use of lower cost materials in the cooling systems, and help to reduce the cost of manufacturing a fuel cell powered vehicle.

In addition to providing reliable corrosion protection for various metallic components in the cooling systems, an engine coolant should also have the following properties to fulfill its requirements for use as a year-round functional fluid for a vehicle: high thermal conductivity; high heat capacity or high specific heat; good fluidity within the temperature range of use; high boiling point; low freeze point; low viscosity; low toxicity and safety of use; cost effectiveness and adequacy of supply; chemically stable over the temperature and conditions of use; low foaming tendency; low boil-over tendency; and good material compatibility (i.e., does not corrode, erode, or degrade system materials-including both metallic and nonmetallic materials). The heat transfer fluid concentrates and heat transfer fluids derived therefrom described herein may be used to provide one or more of the above-described properties.

Among the commonly available engineering alloys, magnesium alloys have the highest strength-to-weight ratio. As a result, the use of magnesium alloys in automobiles has been increasing due to the need for increased fuel economy, reduced pollution, and decreased petroleum dependence. However, the use of magnesium alloys for vehicle powertrain systems (e.g., engine block) has been limited to date. One reason for the limited applications of magnesium alloys in powertrain systems is the poor corrosion resistance of the material, especially when in contact with the water/glycol-based coolants that are commonly used in vehicle cooling systems.

The corrosion inhibitor formulations typically used in conventional water/glycol-based coolants contain high concentrations of ionic species, such as silicates, nitrites, carboxylates (e.g., $C_4$-$C_{18}$ mono- or di-carboxylates, benzoates), molybdates, nitrates, phosphates, phosphonates, borates, and/or the like to provide corrosion protection for various metals in the cooling systems. Although many of these inhibited coolants may provide satisfactory corrosion protection for certain metallic components used in vehicle cooling systems (e.g., aluminum, cast iron, steel, copper, brass, solder, etc.), their corrosion protection for magnesium alloy-based components is poor. Corrosion rates of magnesium alloys are especially high when the magnesium alloys are in galvanic contact with other metals and/or at a high operating temperature when exposed to the various commercial coolants designed for use in vehicle cooling systems that do not contain magnesium alloys.

Thus, there is a need for new corrosion-inhibited coolants and corrosion protection methods for vehicle cooling systems that contain magnesium and/or magnesium alloys.

Throughout this description and in the appended claims, the following definitions are to be understood:

The term "heteroatom" refers to any atom other than carbon and hydrogen. Representative examples of heteroatoms in accordance with the present teachings include but are not limited to nitrogen, oxygen, sulfur, and the like.

The term "alkyl" refers to a substituted or unsubstituted, straight, branched or cyclic hydrocarbon chain containing, in some embodiments, from 1 to 24 carbon atoms. Representative examples of unsubstituted alkyl groups in accordance with the present teachings include but are not limited to methyl, ethyl, propyl, iso-propyl, cyclopropyl, butyl, iso-butyl, tert-butyl, sec-butyl, cyclobutyl, pentyl, cyclopentyl, hexyl, cyclohexyl, and the like.

The term "alkenyl" refers to a substituted or unsubstituted, straight, branched or cyclic, unsaturated hydrocarbon chain that contains at least one double bond and, in some embodiments, from 2 to 24 carbon atoms. Representative unsubstituted alkenyl groups in accordance with the present teachings include but are not limited to ethenyl or vinyl (—CH═CH$_2$), 1-propenyl, 2-propenyl or allyl (—CH$_2$—CH═CH$_2$), 1,3-butadienyl (—CH═CHCH═CH$_2$), 1-butenyl (—CH═CHCH$_2$CH$_3$), hexenyl, pentenyl, 1,3,5-hexatrienyl, and the like. In some embodiments, cycloalkenyl groups have from five to eight carbon atoms and at least one double bond. Representative cycloalkenyl groups in accordance with the present teachings include but are not limited to cyclohexadienyl, cyclohexenyl, cyclopentenyl, cycloheptenyl, cyclooctenyl, cyclohexadienyl, cycloheptadienyl, cyclooctatrienyl, and the like.

The term "alkoxy" refers to a substituted or unsubstituted —O-alkyl group. Representative unsubstituted alkoxy groups in accordance with the present teachings include but are not limited to methoxy, ethoxy, n-propoxy, iso-propoxy, n-butoxy, tert-butoxy, and the like.

The terms "siloxy" and "silyloxy" refer to silicon substituted oxygen groups. The silicon-containing portion of the siloxy group may be substituted or unsubstituted. Representative siloxy groups in accordance with the present teachings include but are not limited to trimethylsilyloxy (—OSi (CH$_3$)$_3$), triethylsilyloxy (—OSi(CH$_2$CH$_3$)$_3$), triisopropylsilyloxy (—OSi(i-Pr)$_3$), tert-butyidimethylsilyloxy (—OSi(tert-Bu)(CH$_3$)$_2$), and the like.

The term "alkynyl" refers to a substituted or unsubstituted, straight, branched or cyclic unsaturated hydrocarbon chain containing at least one triple bond and, in some embodiments, from 2 to 20 carbon atoms.

The term "aryl" refers to a substituted or unsubstituted mono-, bi-, or poly-cyclic aromatic ring system of 4-20 carbon atoms. Representative aryl groups in accordance with the present teachings include but are not limited to benzene, substituted benzene (e.g., toluene, xylenes, styrene), naphthalene, anthracene, biphenyl, and the like.

The term "amino" refers to an unsubstituted or substituted amino (—NH$_2$) group. The amine may be primary (—NH$_2$), secondary (—NHR$^a$) or tertiary (—NR$^a$R$^b$, wherein R$^a$ and R$^b$ are the same or different). Representative substituted amino groups in accordance with the present teachings include but are not limited to methylamino, dimethylamino, ethylamino, diethylamino, 2-propylamino, 1-propylamino, di(n-propyl)amino, di(iso-propyl)amino, methyl-n-propylamino, tert-butylamino, and the like.

The term "halogen" refers to fluorine, chlorine, iodine or bromine.

The term "heterocyclic" refers to a saturated, partially unsaturated, or aromatic ring system containing from 3 to 24 carbon atoms (in some embodiments, 4 to 22 carbon atoms; in other embodiments 6 to 20 carbon atoms) and at least one heteroatom (in some embodiments 1 to 3 heteroatoms). The ring may optionally be substituted with one or more substituents. Moreover, the ring may be mono-, bi- or polycyclic. As used herein, the term "heterocyclic" subsumes the term "heteroaryl." Representative heteroatoms for inclusion in the ring include but are not limited to nitrogen, oxygen, and sulfur. Representative heterocyclic groups in accordance with the present teachings include but are not limited to aziridine, azirine, oxirane, oxirene, thiirane, thiirene, diazirine, oxaziridine, dioxirane, azetidine, azete, oxetane, oxete, thietane, thiete, diazetidine, dioxetane, dioxete, dithietane, dithiete, pyrrolidine, tetrahydrofuran, thiolane, imidazolidine, pyrazolidene, oxazolidine, isooxazolidine, thiazolidine, isothiazolidene, dioxolane, dithiolane, furazan, oxadiazole, dithiazole, tetrazole, piperidine, oxane, pyran, thiane, thiopyran, piperazine, diazines, morpholine, oxazine, thiomorpholine, thiazine, dioxane, dioxine, dithiane, dithiine, trioxane, trithiane, tetrazine, azepane, azepine, oxepane, oxepine, thiepane, thiepine, homopiperazine, diazepine, thiazepine, azocane, azocine, acridine, benzathiazoline, benzimidazole, benzofuran, benzothiapene, benzthiazole, benzothiophenyl, carbazole, cinnoline, furan, imidazole, 1H-indazole, indole, isoindole, isoquinoline, isothiazole, oxazole, isoxazole, oxadiazoles (e.g., 1,2,3-oxadiazole), phenazine, phenothiazine, phenoxazine, phthalazine, pteridine, purine, pyrazine, pyrazole, pyridazine, pyridine, pyrimidine, pyrrole, quinazoline, quinoline, quinoxaline, thiazole, thiadiazoles (e.g., 1,3,4-thiadiazole), thiophene, triazine (e.g., 1,3,5-triazine), triazoles (e.g., 1,2,3-triazole), and the like.

The term "substituted" refers to the optional attachment of one or more substituents onto a backbone structure (e.g., an alkyl backbone, an alkenyl backbone, a heterocyclic backbone, etc.). Representative substituents for use in accordance with the present teachings include but are not limited to hydroxyl, amino (—NH$_2$, —NHR$^a$, —NR$^a$R$^b$), oxy (—O—), carbonyl (—CO—), thiol, alkyl, alkenyl, alkynyl, alkoxy, halo, nitrile, nitro, aryl and heterocyclyl groups. These substituents may optionally be further substituted with 1-3 substituents. Examples of substituted substituents include but are not limited to carboxamide, alkylmercapto, alkylsulphonyl, alkylamino, dialkylamino, carboxylate, alkoxycarbonyl, alkylaryl, aralkyl, alkylheterocyclyl, heterocyclylaryl, haloalkyl, and the like. The substituent should not substantially interfere chemically with the reaction of the invention (e.g., cross react with reactants, terminate the reaction or the like).

The phrase "fuel cell" refers to any type of fuel cell, including but not limited to polymer electrolyte membrane (PEM) fuel cells, direct methanol fuel cells, alkaline fuel cells, phosphoric acid fuel cells, molten carbonate fuel cells, solid oxide fuel cells, and any combination thereof. In addition, as used herein the phrase "fuel cell" encompasses one or multiple individual fuel cells, and one or multiple individual "stacks" (i.e., electrically coupled combinations) of fuel cells.

It is to be understood that elements and features of the various representative embodiments described below may be combined in different ways to produce new embodiments that likewise fall within the scope of the present teachings.

By way of general introduction, a heat transfer fluid concentrate in accordance with the present teachings comprises—or, in some embodiments, consists of or in further embodiments consists essentially of—the following elements: (a) a freezing point depressant; and (b) a non-ionic surfactant comprising (i) a corrosion inhibitor for copper and copper alloys and (ii) a polyalkylene glycol. A conductivity of the heat transfer fluid concentrate is less than or equal to about 100 µS/cm.

The conductivity of a heat transfer fluid concentrate and a ready-to-use heat transfer fluid derived from the heat transfer fluid concentrates (e.g., by dilution with water) in accordance with the present teachings may be one of several different values or fall within one of several different ranges. For example, it is within the scope of the present teachings for a heat transfer fluid concentrate or a ready-to-use heat transfer fluid derived therefrom to have a conductivity that is less than or equal to one of the following values: about 90 µS/cm, 89 µS/cm, 88 µS/cm, 87 µS/cm, 86 µS/cm, 85 µS/cm, 84 µS/cm, 83 µS/cm, 82 µS/cm, 81 µS/cm, 80 µS/cm, 79 µS/cm, 78 µS/cm, 77 µS/cm, 76 µS/cm, 75 µS/cm, 74 µS/cm, 73 µS/cm, 72 µS/cm, 71 µS/cm, 70 µS/cm, 69 µS/cm, 68 µS/cm, 67 µS/cm, 66 µS/cm, 65 µS/cm, 64 µS/cm, 63 µS/cm, 62 µS/cm, 61 µS/cm, 60 µS/cm, 59 µS/cm, 58 µS/cm, 57 µS/cm, 56 µS/cm, 55 µS/cm, 54 µS/cm, 53 µS/cm, 52 µS/cm, 51 µS/cm, 50 µS/cm, 49 µS/cm, 48 µS/cm, 47 µS/cm, 46 µS/cm, 45 µS/cm, 44 µS/cm, 43 µS/cm, 42 µS/cm, 41 µS/cm, 40 µS/cm, 39 µS/cm, 38 µS/cm, 37 µS/cm, 36 µS/cm, 35 µS/cm, 34 µS/cm, 33 µS/cm, 32 µS/cm, 31 µS/cm, 30 µS/cm, 29 µS/cm, 28 µS/cm, 27 µS/cm, 26 µS/cm, 25 µS/cm, 24 µS/cm, 23 µS/cm, 22 µS/cm, 21 µS/cm, 20 µS/cm, 19 µS/cm, 18 µS/cm, 17 µS/cm, 16 µS/cm, 15 µS/cm, 14 µS/cm, 13 µS/cm, 12 µS/cm, 11 µS/cm, 10 µS/cm, 9 µS/cm, 8 µS/cm, 7 µS/cm, 6 µS/cm, or 5 µS/cm.

It is also within the scope of the present teachings for the conductivity of a heat transfer fluid concentrate or a ready-to-use heat transfer fluid derived therefrom to fall within one of many ranges. In a first set of ranges, the conductivity of a heat transfer fluid concentrate and/or a ready-to-use heat transfer fluid derived therefrom is in one of the following ranges: about 1 µS/cm to 99 µS/cm, 2 µS/cm to 98 µS/cm, 3 µS/cm to 97 µS/cm, 4 µS/cm to 96 µS/cm, 5 µS/cm to 95 µS/cm, 6 µS/cm to 94 µS/cm, 7 µS/cm to 93 µS/cm, 8 µS/cm to 92 µS/cm, 9 µS/cm to 91 µS/cm, 10 µS/cm to 90 µS/cm, 11 µS/cm to 89 µS/cm, 12 µS/cm to 88 µS/cm, 13 µS/cm to 87 µS/cm, 14 µS/cm to 86 µS/cm, 15 µS/cm to 85 µS/cm, 16

μS/cm to 84 μS/cm, 17 μS/cm to 83 μS/cm, 18 μS/cm to 82 μS/cm, 19 μS/cm to 81 μS/cm, 20 μS/cm to 80 μS/cm, 21 μS/cm to 79 μS/cm, 22 μS/cm to 78 μS/cm, 23 μS/cm to 77 μS/cm, 24 μS/cm to 76 μS/cm, 25 μS/cm to 75 μS/cm, 26 μS/cm to 74 μS/cm, 27 μS/cm to 73 μS/cm, 28 μS/cm to 72 μS/cm, 29 μS/cm to 71 μS/cm, 30 μS/cm to 70 μS/cm, 31 S6/cm to 69 μS/cm, 32 μS/cm to 68 μS/cm, 33 μS/cm to 67 μS/cm, 34 μS/cm to 66 μS/cm, 35 μS/cm to 65 μS/cm, 36 μS/cm to 64 μS/cm, 37 μS/cm to 63 μS/cm, 38 μS/cm to 62 μS/cm, 39 μS/cm to 61 μS/cm, 40 μS/cm to 60 μS/cm, 41 μS/cm to 59 μS/cm, 42 μS/cm to 58 μS/cm, 43 μS/cm to 57 μS/cm, 44 μS/cm to 56 μS/cm, 45 μS/cm to 55 μS/cm, 46 μS/cm to 54 μS/cm, 47 μS/cm to 53 μS/cm, 48 μS/cm to 52 μS/cm, or 49 μS/cm to 51 μS/cm. In a second set of ranges, the conductivity of a heat transfer fluid concentrate and/or a ready-to-use heat transfer fluid derived therefrom is in one of the following ranges: about 1 μS/cm to 100 μS/cm, 2 μS/cm to 100 μS/cm, 3 μS/cm to 100 μS/cm, 4 μS/cm to 100 μS/cm, 5 μS/cm to 100 μS/cm, 6 μS/cm to 100 μS/cm, 7 μS/cm to 100 μS/cm, 8 μS/cm to 100 μS/cm, 9 μS/cm to 100 μS/cm, 10 μS/cm to 100 μS/cm, 11 μS/cm to 100 μS/cm, 12 μS/cm to 100 μS/cm, 13 μS/cm to 100 μS/cm, 14 μS/cm to 100 μS/cm, 15 μS/cm to 100 μS/cm, 16 μS/cm to 100 μS/cm, 17 μS/cm to 100 μS/cm, 18 μS/cm to 100 μS/cm, 19 μS/cm to 100 μS/cm, 20 μS/cm to 100 μS/cm, 21 μS/cm to 100 μS/cm, 22 μS/cm to 100 μS/cm, 23 μS/cm to 100 μS/cm, 24 μS/cm to 100 μS/cm, 25 μS/cm to 100 μS/cm, 26 μS/cm to 100 μS/cm, 27 μS/cm to 100 μS/cm, 28 μS/cm to 100 μS/cm, 29 μS/cm to 100 μS/cm, 30 μS/cm to 100 μS/cm, 31 μS/cm to 100 μS/cm, 32 μS/cm to 100 μS/cm, 33 μS/cm to 100 μS/cm, 34 μS/cm to 100 μS/cm, 35 μS/cm to 100 μS/cm, 36 μS/cm to 100 μS/cm, 37 μS/cm to 100 μS/cm, 38 μS/cm to 100 μS/cm, 39 μS/cm to 100 μS/cm, 40 μS/cm to 100 μS/cm, 41 μS/cm to 100 μS/cm, 42 μS/cm to 100 μS/cm, 43 μS/cm to 100 μS/cm, 44 μS/cm to 100 μS/cm, 45 μS/cm to 100 μS/cm, 46 μS/cm to 100 μS/cm, 47 μS/cm to 100 μS/cm, 48 μS/cm to 100 μS/cm, 49 μS/cm to 100 μS/cm, 50 μS/cm to 100 μS/cm, 51 μS/cm to 100 μS/cm, 52 μS/cm to 100 μS/cm, 53 μS/cm to 100 μS/cm, 54 μS/cm to 100 μS/cm, 55 μS/cm to 100 μS/cm, 56 μS/cm to 100 μS/cm, 57 μS/cm to 100 μS/cm, 58 μS/cm to 100 μS/cm, 59 μS/cm to 100 μS/cm, 60 S6/cm to 100 μS/cm, 61 μS/cm to 100 μS/cm, 62 μS/cm to 100 μS/cm, 63 μS/cm to 100 μS/cm, 64 μS/cm to 100 μS/cm, 65 μS/cm to 100 μS/cm, 66 μS/cm to 100 μS/cm, 67 μS/cm to 100 μS/cm, 68 μS/cm to 100 μS/cm, 69 μS/cm to 100 μS/cm, 70 μS/cm to 100 μS/cm, 71 μS/cm to 100 μS/cm, 72 μS/cm to 100 μS/cm, 73 μS/cm to 100 μS/cm, 74 μS/cm to 100 μS/cm, 75 S6/cm to 100 μS/cm, 76 μS/cm to 100 μS/cm, 77 μS/cm to 100 μS/cm, 78 μS/cm to 100 μS/cm, 79 μS/cm to 100 μS/cm, 80 μS/cm to 100 μS/cm, 81 μS/cm to 100 μS/cm, 82 μS/cm to 100 μS/cm, 83 μS/cm to 100 μS/cm, 84 μS/cm to 100 μS/cm, 85 S6/cm to 100 μS/cm, 86 S6/cm to 100 μS/cm, 87 μS/cm to 100 μS/cm, 88 μS/cm to 100 μS/cm, 89 μS/cm to 100 S/cm, 90 μS/cm to 100 μS/cm, 91 μS/cm to 100 μS/cm, 92 μS/cm to 100 μS/cm, 93 μS/cm to 100 μS/cm, 94 μS/cm to 100 μS/cm, 95 μS/cm to 100 μS/cm, 96 μS/cm to 100 μS/cm, 97 μS/cm to 100 μS/cm, 98 μS/cm to 100 μS/cm, or 99 μS/cm to 100 μS/cm. In a third set of ranges, the conductivity of a heat transfer fluid concentrate and/or a ready-to-use heat transfer fluid derived therefrom is in one of the following ranges: 1 μS/cm to 99 μS/cm, 1 μS/cm to 98 μS/cm, 1 μS/cm to 97 μS/cm, 1 μS/cm to 96 μS/cm, 1 μS/cm to 95 μS/cm, 1 μS/cm to 94 μS/cm, 1 μS/cm to 93 μS/cm, 1 μS/cm to 92 μS/cm, 1 μS/cm to 91 μS/cm, 1 μS/cm to 90 μS/cm, 1 μS/cm to 89 μS/cm, 1 μS/cm to 88 μS/cm, 1 μS/cm to 87 μS/cm, 1 μS/cm to 86 μS/cm, 1 μS/cm to 85 μS/cm, 1 μS/cm to 84 μS/cm, 1 μS/cm to 83 μS/cm, 1 μS/cm to 82 μS/cm, 1 μS/cm to 81 μS/cm, 1 μS/cm to 80 μS/cm, 1 μS/cm to 79 μS/cm, 1 μS/cm to 78 μS/cm, 1 μS/cm to 77 μS/cm, 1 μS/cm to 76 μS/cm, 1 μS/cm to 75 μS/cm, 1 μS/cm to 74 μS/cm, 1 μS/cm to 73 μS/cm, 1 μS/cm to 72 μS/cm, 1 μS/cm to 71 μS/cm, 1 μS/cm to 70 μS/cm, 1 μS/cm to 69 μS/cm, 1 μS/cm to 68 μS/cm, 1 μS/cm to 67 μS/cm, 1 μS/cm to 66 μS/cm, 1 μS/cm to 65 μS/cm, 1 μS/cm to 64 μS/cm, 1 μS/cm to 63 μS/cm, 1 μS/cm to 62 μS/cm, 1 μS/cm to 61 μS/cm, 1 μS/cm to 60 μS/cm, 1 μS/cm to 59 μS/cm, 1 μS/cm to 58 μS/cm, 1 μS/cm to 57 μS/cm, 1 μS/cm to 56 μS/cm, 1 μS/cm to 55 μS/cm, 1 μS/cm to 54 μS/cm, 1 μS/cm to 53 μS/cm, 1 μS/cm to 52 μS/cm, 1 μS/cm to 51 μS/cm, 1 μS/cm to 50 μS/cm, 1 μS/cm to 49 μS/cm, 1 μS/cm to 48 μS/cm, 1 μS/cm to 47 μS/cm, 1 μS/cm to 46 μS/cm, 1 μS/cm to 45 μS/cm, 1 μS/cm to 44 μS/cm, 1 μS/cm to 43 μS/cm, 1 μS/cm to 42 μS/cm, 1 μS/cm to 41 μS/cm, 1 μS/cm to 40 μS/cm, 1 μS/cm to 39 μS/cm, 1 μS/cm to 38 μS/cm, 1 μS/cm to 37 μS/cm, 1 μS/cm to 36 μS/cm, 1 μS/cm to 35 μS/cm, 1 μS/cm to 34 μS/cm, 1 μS/cm to 33 μS/cm, 1 μS/cm to 32 μS/cm, 1 μS/cm to 31 μS/cm, 1 μS/cm to 30 μS/cm, 1 μS/cm to 29 μS/cm, 1 μS/cm to 28 μS/cm, 1 μS/cm to 27 μS/cm, 1 μS/cm to 26 μS/cm, 1 μS/cm to 25 μS/cm, 1 μS/cm to 24 μS/cm, 1 μS/cm to 23 μS/cm, 1 μS/cm to 22 μS/cm, 1 μS/cm to 21 μS/cm, 1 μS/cm to 20 μS/cm, 1 μS/cm to 19 μS/cm, 1 μS/cm to 18 μS/cm, 1 μS/cm to 17 μS/cm, 1 μS/cm to 16 μS/cm, 1 μS/cm to 15 μS/cm, 1 μS/cm to 14 μS/cm, 1 μS/cm to 13 μS/cm, 1 μS/cm to 12 μS/cm, 1 μS/cm to 11 μS/cm, 1 μS/cm to 10 μS/cm, 1 μS/cm to 9 μS/cm, 1 μS/cm to 8 μS/cm, 1 μS/cm to 7 μS/cm, 1 μS/cm to 6 μS/cm, or 1 μS/cm to 5 μS/cm.

Heat transfer fluid concentrates in accordance with the present teachings include a freezing point depressant. Representative freezing point depressants suitable for use in a heat transfer fluid concentrate in accordance with the present teachings include but are not limited to alcohol and mixture of alcohols (e.g., monohydric alcohols, polyhydric alcohols, and mixtures thereof). Representative alcohols for use as freezing point depressants include but are not limited to methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol (1,2-propanediol), 1,3-propylene glycol (1,3-propanediol), dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, $C_1$-$C_4$ alkoxy alkanols (e.g., methoxyethanol), and/or the like, and combinations thereof. In some embodiments, the freezing point depressant comprises an alcohol which, in some embodiments, is selected from the group consisting of ethylene glycol, 1,2-propylene glycol, 1,3-propanediol, glycerol, and a combination thereof. In some embodiments, a heat transfer fluid concentrate in accordance with the present teachings contains a glycol freezing point depressant.

The concentration of freezing point depressant may vary depending on the application. In some embodiments, the concentration of the freezing point depressant ranges from about 10 wt. % to about 99.85% wt. % based on the total weight of the heat transfer fluid concentrate. Within this range, the freezing point depressant may be present in an amount greater than or equal to about 30 wt. %, in some embodiments greater than or equal to about 40 wt. %, based on the total weight of the heat transfer fluid concentrate. Also within this range, the freezing point depressant may be present in an amount less than or equal to about 99.5 wt. %, in some embodiments less than or equal to about 99 wt. %. In other embodiments, the concentration of the freezing point depressant ranges from about 30 wt. % to about 99.5% wt. % based on the total weight of the heat transfer fluid concentrate. In other embodiments, the concentration of the freezing point depressant ranges from about 40 wt. % to about 99% wt. % based on the total weight of the heat transfer fluid concentrate. In other embodiments, the concentration of the freezing point depressant ranges from about 15 wt. % to about 99% wt. % based on the total weight of the heat transfer fluid concentrate. In other embodiments, the concentration of the freezing point depressant ranges from about 20 wt. % to about 98% wt. % based on the total weight of the heat transfer fluid concentrate. In further embodiments, the concentration of the freezing point depressant ranges from about 20 wt. % to about 96% wt. % based on the total weight of the heat transfer fluid concentrate.

Heat transfer fluid concentrates in accordance with the present teachings include one or a plurality of non-ionic surfactants. In illustrative embodiments, a non-ionic surfactant for use in accordance with the present teachings includes (i) a corrosion inhibitor for copper and copper alloys and (ii) a polyalkylene glycol.

Representative copper and copper alloy corrosion inhibitors for use in accordance with the present teachings include but are not limited to compounds containing a 5- or 6-membered heterocyclic ring as the active functional group, wherein the heterocyclic ring contains at least one nitrogen atom (e.g., an azole compound). In some embodiments, a copper and copper alloy corrosion inhibitor includes a substituted or unsubstituted compound—and/or a salt thereof (e.g., a sodium or potassium salt)—selected from the group consisting of benzotriazole, a hydrobenzotriazole (e.g., tetrahydrobenzotriazole), tolyltriazole, a hydrotolyltriazole (e.g., 4-methyl-1H-benzontriazole, 5-methyl-1H-benzotriazole, and other tetrahydrobenzotriazoles as described in U.S. Pat. No. 8,236,205 B1), methyl benzotriazole (e.g., 4-methyl benzotriazole, 5-methyl benzotriazole), alkyl benzotriazoles (e.g., benzotriazoles having a $C_2$ to $C_{20}$ alkyl group, including but not limited to butyl benzotriazole), mercaptobenzothiazole, thiazole, imidazole, benzimidazole, indazole, tetrazole, and/or the like, and combinations thereof. In some embodiments, the copper and copper alloy corrosion inhibitor used in a heat transfer fluid concentrate in accordance with the present teachings includes an azole compound which, in illustrative embodiments, includes a benzotriazole, a tolyltriazole, or a combination thereof. In some embodiments, one or more of the aforementioned copper and copper alloy corrosion inhibitors may optionally be substituted.

Representative polyalkylene glycols for use in accordance with the present teachings include but are not limited to polyethylene glycols, polypropylene glycols, methoxypolyethylene glycols, and/or the like, and combinations thereof. In some embodiments, polyethylene glycols in accordance with the present teachings include but are not limited to CARBOWAX™ polyethylene glycols and methoxypolyethylene glycols from Dow Chemical Company (e.g., CARBOWAX PEG 200, 300, 400, 600, 900, 1000, 1450, 3350, 4000 & 8000, etc.), PLURACOL® polyethylene glycols from BASF Corp. (e.g., Pluracol® E 200, 300, 400, 600, 1000, 2000, 3350, 4000, 6000 and 8000, etc.), POLYGLYCOL polyethylene glycols from CLARIANT International LTD (e.g., POLYGLYCOL 200, 200 LVC, 300, 400, 600, 600PU, 800, 1000, 1500FL, 1500 FL PU, 1500 PS, 1500 S, 2000 FL, 3000 P, 3000 S, 3400 FL, 4000 FL, 4000 M50, 4000 P, 4000 S, 5500 FL, 6000 FL, 6000 P, 6000 PF, 6000 PF, 6000 PFH, 6000 S, 8000 FL, 8000 P, 8000 PF, 8000 PS, 8000 S, 9000 Fl, 10000 FL, 10000 S, 12000 P, 12000 S, 20000 P, 20000 SR, 20000 SR M50, 20000 SRU, 35000S, Cl 14000 FL, CL 14000 S, and C1 20000 S, etc.), and/or the like, and combinations thereof. In some embodiments, polypropylene glycols in accordance with the present teachings include but are not limited to polypropylene glycols (or P-series polyglycols) from Dow Chemical Company (e.g., P1000 TB, P1200, P2000, P4000), Lupranol® linear polypropylene glycols from BASF Corp. (e.g., LUPRANOL® 1000/1, 1000/2, 1005/1, 1100/1, 1200, 2004/1, etc.), and/or the like, and combinations thereof.

The concentration of the non-ionic surfactant-which, at a minimum, includes a copper and copper alloy corrosion inhibitor and a polyalkylene glycol (and which, in some embodiments, may also include one or more additional non-ionic surfactants)—may vary depending on the application. In some embodiments, the non-ionic surfactant may be present in the composition in an amount of about 0.001 wt. % to about 5 wt. % based on a total weight of the heat transfer fluid concentrate. In other embodiments, the non-ionic surfactant may be present in the composition in an amount of about 0.001 wt. % to about 2 wt. % based on a total weight of the heat transfer fluid concentrate. In other embodiments, the non-ionic surfactant may be present in the composition in an amount of about 0.005 wt. % to about 1 wt. % based on a total weight of the heat transfer fluid concentrate. In some embodiments, the non-ionic surfactant may be present in the composition in an amount of about 0.01 wt. % to about 0.5 wt. % based on a total weight of the heat transfer fluid concentrate. In other embodiments, the non-ionic surfactant may be present in the composition in an amount of about 0.01 wt. % to about 5 wt. % based on a total weight of the heat transfer fluid concentrate. In some embodiments, the amount of the non-ionic surfactant ranges from about 0.01 wt. % to about 4 wt. % based on the total weight of the corrosion inhibitor formulation. Within this range, the non-ionic surfactant may be present in an amount greater than or equal to about 0.05 wt. % based on a total weight of the heat transfer fluid concentrate and, in some embodiments, greater than or equal to about 0.1 wt. %. Also within this range, the non-ionic surfactant may be present in an amount less than or equal to about 2 wt. % based on a total weight of the heat transfer fluid concentrate, and, in some embodiments, less than or equal to about 1 wt. %, 0.9 wt. %, 0.8 wt. %, 0.7 wt. %, 0.6 wt. %, or 0.5 wt. % based on a total weight of the heat transfer fluid concentrate.

In some embodiments, heat transfer fluid concentrates in accordance with the present teachings may optionally include one or a plurality of additional non-ionic surfactants in addition to the corrosion inhibitor for copper and copper alloys and the polyalkylene glycol. Representative additional non-ionic surfactants for optional use include but are not limited to sorbitan fatty acid esters, alkoxylated alcohols, polyalkylene glycol esters, copolymers of ethylene oxide and propylene oxide, polyoxyalkylene derivatives of a sorbitan fatty acid ester, and/or the like, and combinations thereof. In some embodiments, the additional non-ionic surfactant for optional use includes a sorbitan fatty acid ester and an alkoxylated alcohol. While neither desiring to be bound by any particular theory nor intending to limit in any measure the scope of the appended claims or their equivalents, it is presently believed that an alkoxylated alcohol used in accordance with the present teachings may remain in solution in a heat transfer fluid under operating conditions without being consumed or degraded, thus resulting in robust anti-foam properties for the heat transfer fluid. In some embodiments, the average molecular weight of the additional non-ionic surfactant for optional use in accordance with the present teachings is between about 55 and about 300,000 and, in some embodiments, between about 110 and about 10,000.

Representative sorbitan fatty acid esters for optional use as an additional non-ionic surfactant in accordance with the present teachings include but are not limited to sorbitan monolaurate (e.g., sold under the tradename Span® 20, Arlacel® 20, S-MAZ®20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel®80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90), and/or the like, and combinations thereof.

Representative alkoxylated alcohols for optional use as an additional non-ionic surfactant in accordance with the present teachings include but are not limited to ethoxylated alcohols, propoxylated alcohols, and/or the like, and combinations thereof.

In some embodiments, an alkoxylated alcohol for optional use in accordance with the present teachings has a formula (I)

$$RO(CH_2CH_2O)_j(CH_2CH_2CH_2O)_kH, \quad (I)$$

wherein R is a linear primary alcohol, j represents the total number of moles of ethylene oxide, and k represents the total number of moles of propylene oxide. In some embodiments, in formula (I), R is a $C_4$-$C_{25}$ linear primary alcohol (in some embodiments, a $C_6$-$C_{15}$ linear primary alcohol and, in other embodiments, a $C_7$-$C_{12}$ linear primary alcohol), j is an integer from 0 to 15 (inclusive), k is an integer from 0 to 15 (inclusive), and j+k is an integer greater than or equal to 1.

In some embodiments, an alkoxylated alcohol for optional use in accordance with the present teachings includes an ethoxylated alcohol of formula (II)

$$RO(CH_2CH_2O)_nH, \quad (II)$$

wherein R is a linear primary alcohol and n represents the total number of moles of ethylene oxide. In some embodiments, in formula (II), R is a $C_4$-$C_{25}$ linear primary alcohol (in some embodiments, a $C_6$-$C_{15}$ linear primary alcohol and, in other embodiments, a $C_7$-$C_{12}$ linear primary alcohol), and n is an integer from 1 to 15 (inclusive).

In some embodiments, an alkoxylated alcohol for optional use in accordance with the present teachings includes a propoxylated alcohol of formula (III)

$$RO(CH_2CH_2CH_2O)_mH, \quad (III)$$

wherein R is linear primary alcohol and m represents the total number of moles of propylene oxide. In some embodiments, in formula (III), R is a $C_4$-$C_{25}$ linear primary alcohol (in some embodiments, a $C_6$-$C_{15}$ linear primary alcohol and, in other embodiments, a $C_7$-$C_{12}$ linear primary alcohol), and m is an integer from 1 to 15 (inclusive).

Representative examples of commercially available alkoxylated alcohols for optional use as an additional non-ionic surfactant in accordance with the present teachings include but are not limited to (a) TRITON™ EF-19 surfactant (>98% Alcohols, $C_8$-$C_{10}$, ethoxylated propoxylated, CAS #88603-25-8) available from The Dow Chemical Co. (Midland, MI), (b) the MACOL® LF 110 surfactant (alkoxylated alcohol) and the PLURAFAC® SLF 18 surfactant (100% Alcohols, $C_6$-$C_{10}$, ethoxylated propoxylated, CAS number: 68987-81-5) or PLURAFAC® SLF-180 alcohol alkoxylate surfactant available from BASF Corporation (Mount Olive, NJ or Florham Park, NJ), (c) the TOM-ADOL™ series of ethoxylated alcohols available from Tomah Products, Inc. (Milton, WI). Representative TOM-ADOL™ ethoxylated alcohols for optional use in accordance with the present teachings include but are not limited to poly (2.5) or (6) or (8) oxyethylene $C_{9-11}$ alcohol (e.g., TOMADOL™ 91-2.5, TOMADOL™ 91-6, TOMADOL™ 91-8), poly (3) or (5) or (7) or (9) oxyethylene Cn alcohol (e.g., TOMADOL™ 1-3, TOMADOL™ 1-5, TOMADOL™ 1-7, TOMADOL™ 1-9), poly (1) or (3) or (5) or (6.5) oxyethylene $C_{12-13}$ alcohol (e.g., TOMADOL™ 23-1, TOMADOL™ 23-3, TOMADOL™ 23-5, TOMADOL™ 23-6.5), poly (3) or (7) or (9) or (12) oxyethylene $C_{12-15}$ alcohol (e.g., TOMADOL™ 25-3, TOMADOL™ 25-7, TOMADOL™ 25-9, TOMADOL™ 25-12), poly (2.5) or (7) or (13) oxyethylene $C_{14-15}$ alcohol (e.g., TOMADOL™ 45-2.5, TOMADOL™ 45-7, TOMADOL™ 45-13), and (d) TRITON™ DF-16 surfactant (>98.0% alcohols, $C_8$-$C_{10}$, ethoxylated propoxylated, CAS #68603-25-8, and <2.0% poly(ethylene oxide), CAS #25322-68-3), (e) TRITON™ DF-12 Surfactant (100% alcohols, C8-C10, ethers with polyethylene-polypropylene glycol monobenzyl ether, CAS #68154-99-4), (f) DeIONIC LF-EP-15 and/or DeIONIC LF-EP alkoxylated alcohol, and/or the like, and combinations thereof.

For embodiments of a heat transfer concentrate in which one or more additional non-ionic surfactants are present in addition to a corrosion inhibitor for copper and copper alloys and a polyalkylene glycol, the concentration of the one or more additional non-ionic surfactants may vary depending on the application. In some embodiments, the one or more additional non-ionic surfactants may be present in the composition in an amount of about 0.001 wt. % to about 3 wt. % based on a total weight of the heat transfer fluid concentrate. In other embodiments, the one or more additional non-ionic surfactants may be present in the composition in an amount of about 0.001 wt. % to about 1 wt. % based on a total weight of the heat transfer fluid concentrate. Within this range, the one or more additional non-ionic surfactants may be present in an amount less than or equal to about 0.9 wt. %, in some embodiments less than or equal to about 0.8 wt. %, in some embodiments less than or equal to about 0.7 wt. %, in some embodiments less than or equal to about 0.6 wt. %, and in some embodiments less than or equal to about 0.5 wt. % based on a total weight of the heat transfer fluid concentrate.

Representative polyalkylene glycol esters for optional use as an additional non-ionic surfactant in accordance with the present teachings include but are not limited to mono- and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.), and/or the like, and combinations thereof.

Representative copolymers of ethylene oxide (EO) and propylene oxide (PO) for optional use as an additional non-ionic surfactant in accordance with the present teachings include but are not limited to various Pluronic and Pluronic R block copolymer surfactants from BASF, DOWFAX non-ionic surfactants, UCON™ fluids and SYNALOX lubricants from DOW Chemical, and/or the like, and combinations thereof.

Representative polyoxyalkylene derivatives of a sorbitan fatty acid ester for optional use as an additional non-ionic surfactant in accordance with the present teachings include but are not limited to polyoxyethylene 20 sorbitan monolaurate (e.g., products sold under the tradenames TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitan monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K), and/or the like, and combinations thereof.

In some embodiments, heat transfer fluid concentrates in accordance with the present teachings may be used directly as a heat transfer fluid without being diluted and without the addition of water.

In some embodiments, heat transfer fluid concentrates in accordance with the present teachings may optionally include water-either in addition to, or as an alternative to, a freezing point depressant. Ready-to-use heat transfer fluids derived from heat transfer fluid concentrates (e.g., by dilution) typically contain water. In some embodiments, a heat transfer fluid concentrate in accordance with the present teachings that contains a freezing point depressant may be diluted with water to a 40 vol. % to 60 vol. % solution.

The type of water used in accordance with the present teachings is not restricted. However, in some embodiments, the water used in a heat transfer fluid concentrate and/or a heat transfer fluid in accordance with the present teachings includes de-ionized water, demineralized water, softened water, or a combination thereof. In some embodiments, a hardness of the water due to $CaCO_3$ is less than about 10 ppm. In other embodiments, an electrical conductivity of the water is less than about 30 µS/cm. In further embodiments, a hardness of the water due to $CaCO_3$ is less than about 10 ppm and an electrical conductivity of the water is less than about 30 µS/cm.

For embodiments of a heat transfer concentrate in which water is present, the concentration of the water may vary depending on the application. In some embodiments, the water is present in an amount of about 0.1 wt. % to about 90 wt. % based on a total weight of the heat transfer fluid concentrate. Within this range, the water may be present in an amount greater than or equal to about 0.5 wt. %, in some embodiments, greater than or equal to about 1 wt. %, based on a total weight of the heat transfer fluid concentrate. Also within this range, the water may be present in an amount less than about 70 wt. %, in some embodiments less than about 60 wt. %, based on a total weight of the heat transfer fluid concentrate. In other embodiments, the water is present in an amount of about 0.5 wt. % to about 70 wt. % based on a total weight of the heat transfer fluid concentrate. In further embodiments, the water is present in an amount of about 1 wt. % to about 60 wt. % based on a total weight of the heat transfer fluid concentrate.

In some embodiments, heat transfer fluid concentrates in accordance with the present teachings may optionally include one or more additional low-conductivity corrosion inhibitors. Representative low-conductivity corrosion inhibitors for optional use in accordance with the present teachings include but are not limited to siloxane compounds, colloidal silica, amine compounds, and/or the like, and combinations thereof.

Representative siloxane compounds for optional use as low-conductivity corrosion inhibitors in accordance with the present teachings include but are not limited to the SILWET™, SILQUEST™, and FORMASIL™ materials available from Momentive Performance Materials Inc. (Waterford, NY) and/or GE Silicones-OSi Specialties, and/or the like, and combinations thereof. Representative examples of commercially available siloxane compounds that may be used in accordance with the present teachings include but are not limited to SILWET L-77, SILWET L-7657, SILWET L-7650, SILWET L-7608, SILWET L-7210, SILWET L-7220, siloxane-polyether copolymers available from Dow Corning Corp. (Midland, MI), and/or the like, and combinations thereof. In some embodiments, non-conductive or nearly non-conductive organosilane-based compounds containing one or more silicon-carbon bonds (e.g., compounds that are capable of hydrolyzing in the presence of water to form silanol compounds having one or more Si—OH groups), including but not limited to alkoxysilanes, may be used. Representative examples of alkoxysilanes for use in accordance with the present teachings include but are not limited to FORMASIL 891, FORMASIL 593, FORMASIL 433, SILQUEST® Y-5560 silane (polyalkyleneoxidealkoxysilane), SILQUEST® A-186 [2-(3,4-epoxycyclohexyl)ethyltrimethoxysilane], SILQUEST® A-187 (3-glycidoxypropyltrimethoxysilane), 3-aminopropyltriethoxysilane, N-2-(aminoethyl)-3-aminopropyltrimethoxysilane, octyltriethoxysilane, vinyltriethoxylsilane, vinyltrimethoxylsilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, and/or the like, and combinations thereof. For embodiments of a heat transfer concentrate in which a siloxane compound is present, the concentration of the siloxane compound may vary depending on the application. In some embodiments, the siloxane compound or a mixture of siloxane compounds are present in an amount of about 0.01 wt. % to about 10 wt. % based on a total weight of the heat transfer fluid concentrate. In other embodiments, the siloxane compound or a mixture of siloxane compounds are present in an amount of about 0.02 wt. % to about 2 wt. % based on a total weight of the heat transfer fluid concentrate.

Representative colloidal silica for optional use as low-conductivity corrosion inhibitors in accordance with the present teachings include but are not limited to colloidal silica having a nominal particle size between about 1 nm and about 200 nm. In some embodiments, the colloidal silica particle size is about 1 nm to about 100 nm. In other embodiments, the colloidal silica particle diameter is between about 1 nm and about 40 nm. Within this range, the particle size of the colloidal silica may be greater than or equal to about 1 nm, in some embodiment greater than or equal to about 2 nm. Also within this range, the particle size of the colloidal silica may be less than or equal to about 100 nm, in some embodiments less than or equal to about 40 nm. Suitable colloidal silicas for optional use in accordance with the present teachings include but are not limited to Ludox colloidal silica from DuPont or Grace Davidson, Nyacol and/or Bindzil colloidal silica from Akzo Nobel-Eka Chemicals, Snowtex colloidal silica from Nissan Chemical, colloidal silica from Nalco and other suppliers, and/or the like, and combinations thereof. While neither desiring to be bound by any particular theory nor intending to limit in any measure the scope of the appended claims or their equivalents, it is presently believed that by using colloidal silica in a heat transfer fluid, the nanoparticles may increase heat transfer efficiency and/or heat capacity of the heat transfer fluids. For embodiments of a heat transfer concentrate in which colloidal silica is present, the concentration of the colloidal silica may vary depending on the application. In some embodiments, the colloidal silica is present in an amount of about 0 ppm to about 20,000 ppm (i.e., up to about 20,000 ppm) and, in some embodiments, from about 0 ppm to about 2,000 ppm (i.e., up to about 2,000 ppm) of the heat transfer fluid concentrate.

Representative amine compounds for optional use as low-conductivity corrosion inhibitors in accordance with the present teachings include but are not limited to ethanolamine, diethanolamine, triethanolamine, morpholine, benzylamine, cyclohexylamine, dicyclohexylamine, hexylamine, AMP (2-amino-2-methyl-1-propanol or isobutanolamine), DEAE (diethylethanolamine), DEHA (diethylhydroxylamine), DMAE (2-dimethylaminoethanol), DMAP (dimethylamino-2-propanol), MOPA (3-methoxypropylamine), and/or the like, and combinations thereof.

In some embodiments, heat transfer fluid concentrates in accordance with the present teachings may optionally further include one or more additional components. The combined total concentration of the optional additional components may range from about 0.0 wt. % to about 15 wt. % (i.e., up to about 15 wt. %) based on the total weight of the heat transfer fluid concentrate. In some embodiments, the combined total concentration of the optional additional components is between about 0.0001 wt. % and about 10 wt. % based on the total weight of the heat transfer fluid concentrate. In other embodiments, the combined total concentration of the optional additional components is between about 0.001 wt. % and about 5 wt. % based on the total weight of the heat transfer fluid concentrate. In further embodiments, the combined total concentration of the optional additional components is between about 0.01 wt. % and about 3 wt. % based on the total weight of the heat transfer fluid concentrate.

Representative additional components that may optionally be present in a corrosion inhibitor formulation in accordance with the present teachings include but not limited to a $C_1$-$C_{20}$ tetraalkylorthosilicate esters, non-conductive colorants, antifoaming agents or defoamers, biocides, pH-adjusting agents, wetting agents, other non-ionic surfactants, other non-conductive or low-conductivity corrosion inhibitors non-ionic dispersants, scale inhibitors, bittering agents, other coolant/antifreeze additives, and/or the like, and combinations thereof. If present, the optional one or more additional components should be non-conductive or have low electrical conductivity. In some embodiments, a heat transfer fluid concentrate in accordance with the present teachings may specifically exclude one or more of these optional additional components (e.g., be substantially "free" of one or more of the aforementioned additional components). In some embodiments, the pH of a heat transfer fluid concentrate in accordance with the present teachings at 50% concentration is between about 6.8 and about 10.0, in some embodiments between about 6.8 and about 9.0.

Representative $C_1$-$C_{20}$ tetraalkylorthosilicate esters for optional use as additional components in accordance with the present teachings include but are not limited to tetramethylorthosilicate, tetraethylorthosilicate, and/or the like, and combinations thereof. For embodiments of a heat transfer fluid concentrate in which a $C_1$-$C_{20}$ tetraalkylorthosilicate ester is present, the concentration of the $C_1$-$C_{20}$ tetraalkylorthosilicate ester may vary depending on the application. In some embodiments, the $C_1$-$C_{20}$ tetraalkylorthosilicate ester is present in an amount from about 0 wt. % to about 5 wt. % based on the total weight of the heat transfer fluid concentrate.

Representative non-conductive colorants or dyes for optional use in in accordance with the present teachings include but are not limited to those described in United States Patent Application Publication Nos. 2006/0051639 A1 and 2006/0063050 A1. Additional representative non-conductive colorants or dyes for optional use in in accordance with the present teachings include but are not limited to the various polymeric colorants from Milliken & Company of Spartanburg, S.C. and the colorants from Chromatech Inc. of Canton, MI, including but not limited to Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Blue EA, and Liquitint Red HN, and/or the like, and combinations thereof.

As used herein, the term "non-conductive" refers to a colorant that produces a conductivity increase of less than about 10 µS/cm when introduced into a standard solution of deionized water at a maximum concentration of no more than about 0.2% by weight based on the total weight of the standard solution. In some embodiments, suitable non-conductive colorants will possess good stability in a mixture of alcohol and water under fuel cell-operating conditions (e.g., typically temperatures of from about 40° C. to about 100° C.

In some embodiments, the optional non-conductive colorant is substantially free of functional groups that will form an ionic species due to hydrolysis in an aqueous alcohol or glycol solution. As used herein in the context of non-conductive colorants, the phrase "substantially free" refers to an amount that does not exceed an amount that will lead to the conductivity of the colored heat transfer fluid being higher than 10 µS/cm. In some embodiments, the optional non-conductive colorant is substantially free of functional groups selected from the group consisting of carboxylate groups, sulfonate groups, phosphonate groups, quaternary ammonium cation groups, groups that carry a positive charge, groups that carry a negative charge, and combinations thereof. Illustrative examples of groups that carry a positive charge include but are not limited to $Na^+$, $Cu^{2+}$, $N^+R_3$ (wherein R is independently H, $C_1$ to $C_{20}$ alkyl or aromatic ring containing groups), $Fe^{3+}$, and/or the like, and combinations thereof. Illustrative examples of groups that carry a negative charge include but are not limited to Cl—, Br—, I—, and/or the like, and combinations thereof.

In some embodiments, the optional non-conductive colorant may include at least one of the following chromophores: anthraquinone, triphenylmethane, diphenylmethane, triarylmethane, diarylmethane, azo-containing compounds, disazo-containing compounds, trisazo-containing compounds, diazo-containing compounds, xanthene, acridine, indene, thiazole, two or more conjugated aromatic groups, two or more conjugated heterocyclic groups (e.g. stilbene and/or pyrazoline and/or coumarine-type radicals or mixtures thereof), three or more conjugated carbon-carbon double bonds (e.g., carotene), and/or the like, and combinations thereof. In some embodiments, the chromophore may include one or more of the following: triphenylmethane, diphenylmethane, triarylmethane, diarylmethane, and an azo-containing radical.

In some embodiments, the optional non-conductive colorant may contain alkyleneoxy or alkoxy groups and at least one chromophore such as those described above. In some embodiments, the chromophore contained in the colorants may be selected from the group consisting of anthraquinone, triphenylmethane, diphenylmethane, triarylmethane, diarylmethane, azo-containing compounds, disazo-containing compounds, trisazo-containing compounds, diazo-containing compounds, two or more conjugated aromatic groups, two or more conjugated heterocyclic groups, and/or the like, and combinations thereof.

In alternative embodiments, suitable optional non-conductive colorants have the formula (IV):

wherein R is an organic chromophore selected from the group consisting of anthraquinone, triphenylmethane, diphenylmethane, triarylmethane, diarylmethane, azo-containing compounds, disazo-containing compounds, trisazo-containing compounds, diazo-containing compounds, xanthene, acridine, indene, thiazole, two or more conjugated aromatic groups, two or more conjugated heterocyclic groups, and combinations thereof; A is a linking moiety in the chromophore and is selected from the group consisting of O, N and S; k is 0 or 1; B is selected from the group consisting of one or more alkyleneoxy or alkoxy groups containing from 1 to 8 carbon atoms; n is an integer of from 1 to 100; m is 1 or 2; x is an integer from 1 to 5; and $R^1$ is selected from the group consisting of H, $C_1$-$C_6$ alkyl groups or alkoxy groups containing from 1 to 8 carbon atoms, and combinations thereof.

In some embodiments, suitable optional non-conductive colorants are those colorants of formula (IV) shown above in which A is N or O; B is selected from the group consisting of one or more alkyleneoxy constituents containing from 2 to 4 carbon atoms, n is from 1 to 30, m is 1 or 2, X is 1 or 2, and $R^1$ is H or a $C_1$-$C_4$ alkyl groups or alkoxy groups containing from 1 to 6 carbon atoms.

In some embodiments, the optional non-conductive colorants may be prepared by various known methods including but not limited to those described in U.S. Pat. Nos. 4,284,729, 6,528,564 B1, or other patents issued to Milliken & Company of Spartanburg, SC For example, suitable optional colorants may be prepared by converting a dyestuff intermediate containing a primary amino group into the corresponding polymeric compound and employing the resulting compound to produce a compound having a chromophoric group in the molecule. In the case of azo dyestuffs, this may be accomplished by reacting a primary aromatic amine with an appropriate amount of an alkylene oxide or mixtures of alkylene oxides (e.g., ethylene oxide and the like) according to known procedures, and then coupling the resulting compound with a diazonium salt of an aromatic amine. In order to prepare liquid colorants of the triarylmethane class, aromatic amines that have been reacted as stated above with an alkylene oxide may be condensed with aromatic aldehydes and the resulting condensation products oxidized to form the triarylmethane liquid colorants. Other suitable optional colorants may also be prepared by these and other known procedures.

In one embodiment, the optional colorants containing ionic species may be used if purification methods are employed. Illustrative purification and chemical separation techniques include, treatment with ion exchange resins, reversed osmosis, extraction, absorption, distillation, filtration, etc. and similar processes used to remove the ionic species in order to obtain a purified colorant that is electrically non-conductive and suitable for use herein.

Representative antifoaming agents or defoamers for optional use in accordance with the present teachings include but are not limited to an organo-modified polydimethylsiloxane-containing polyalkylene glycol, siloxane polyalkylene oxide copolymer, polyalkylene oxide, "PM-5150" available from Prestone Products Corp., "Pluronic L-61" and "Plurafac® LF 224 from BASF Corp., "Patcote 492", "Patcote 415" and other Patcote-branded antifoam available from Hydrite Chemical Co. and other suppliers, and "Foam Ban 136B" and other Foam Ban antifoams available from Munzing Chemie GmbH or affiliated companies. The optional antifoam agents may also include polydimethylsiloxane emulsion-based antifoams, including but not limited to PC-5450NF from Performance Chemicals, LLC in Boscawen, NH; and CNC antifoam XD-55 NF and XD-56 from CNC International in Woonsocket in RI. In some embodiments, the optional antifoam agents may include a silicone or organo-modified polydimethylsiloxane, for example, SAG brand of silicone-based antifoams (e.g., SAG-10, Silbreak® 320) from OSI Specialties Inc., Momentive Performance Materials Inc. in Waterford, NY, Dow Corning and other suppliers; an ethylene oxide-propylene oxide (EO-PO) block copolymer and a propylene oxide-ethylene oxide-propylene oxide (PO-EO-PO) block copolymer (e.g., Pluronic L61, Pluronic L81, and other Pluronic and Pluronic C products); poly(ethylene oxide) or poly(propylene oxide), for example, PPG 2000 (e.g., polypropylene oxide with an average molecular weight of 2000 Daltons); polydiorganosiloxane-based products (e.g., products containing polydimethylsiloxane (PDMS), and the like); fatty acids or fatty acid esters (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene, and an aromatic oil; and/or the like; and combinations thereof.

Representative biocides for optional use in accordance with the present teachings include but are not limited to various non-oxidizing biocides, such as glutaraldehyde, isothiazolin, 5-chloro-2-methyl-4-isothiazolin-3-one, 2-methyl-4-isothiazolin-3-one, 1,2-benzisothiazolin-3-one, 2,2-dibromo-3-nitrilopropionamide, 2-bromo-2-nitropropane-1,3-diol, methylene bis(thiocyanate), terbuthylazine, tetrakis(hydroxymethyl) phosphonium sulphate, and/or the like, and combinations thereof.

In some embodiments, a heat transfer fluid concentrate in accordance with the present teachings is used directly without prior dilution. In other embodiments, a heat transfer fluid concentrate in accordance with the present teachings may be diluted (e.g., with water and/or a freezing point depressant) to form a heat transfer fluid. For example, in some embodiments, the heat transfer fluid concentrate may be diluted by about 10 vol. % to about 75 vol. % to form a heat transfer fluid. In some embodiments, the water used for dilution is deionized water as described in Section 4.5 of ASTM D3306-10.

In some embodiments, heat transfer fluid concentrate in accordance with the present teachings may be provided as a commercially available product. In some embodiments, heat transfer fluid concentrate in accordance with the present teachings may be provided as a commercially available product intended for direct use as a heat transfer fluid without requiring any type of dilution (e.g., without the addition of water). In other embodiments, a ready-to-use heat transfer fluid in which the heat transfer fluid concentrate has been pre-diluted to around 50 vol. % with water may be provided as a commercially available product. In preparing a ready-to-use heat transfer fluid by dilution, the optimal level of water added to the heat transfer concentrate at use conditions may be determined by the desired freeze-up, boil-over, and corrosion protection requirements.

Heat transfer fluid concentrate that has not been diluted by adding water is typically not used in an engine cooling system as a heat transfer fluid due to its relatively low heat transfer coefficient (or specific heat), high viscosity, and high freeze point. Thus, heat transfer fluid concentrates may be diluted (e.g., to 30 vol. % to 60 vol. % solutions) by adding water before being used in engine cooling systems as heat transfer fluids. Vehicle manufacturers typically use 50 vol. % heat transfer concentrate diluted by water as factory fill fluid in vehicle cooling systems. Heat transfer fluid products that are pre-diluted by water to contain about 30 vol. % to about 60 vol. % heat transfer fluid concentrate are ready-to-use coolants because no additional water is needed when they are added into a vehicle cooling system.

In a ready-to-use heat transfer fluid, the freezing point depressant may be present in an amount of about 1 wt. % to less than about 90 wt. %, based on the total weight of the ready-to-use heat transfer fluid. Within this range, the amount of the freezing point depressant may be greater than or equal to about 10 wt. %, greater than or equal to about 20 wt. %, greater than or equal to about 30 wt. %, greater than or equal to about 40 wt. %, greater than or equal to about 50 wt. %, greater than or equal to about 55 wt. %, greater than or equal to about 60 wt. %, greater than or equal to about 65 wt. %, greater than or equal to about 70 wt. %, greater than or equal to about 75 wt. %, greater than or equal to about 80 wt. %, greater than or equal to about 85 wt. %, greater than or equal to about 86 wt. %, greater than or equal to about 87 wt. %, greater than or equal to about 88 wt. %, or greater than or equal to about 89 wt. %, but less than about 90 wt. % based on the total weight of the ready-to-use heat transfer fluid. Also, within this range, the amount of the freezing point depressant may be less than or equal to about 30 wt. %, less than or equal to about 40 wt. %, less than or equal to about 50 wt. %, less than or equal to about 55 wt. %, less than or equal to about 60 wt. %, less than or equal to about 65 wt. %, less than or equal to about 70 wt. %, less than or equal to about 75 wt. %, less than or equal to about 80 wt. %, less than or equal to about 85 wt. %, less than or equal to about 86 wt. %, less than or equal to about 87 wt. %, less than or equal to about 88 wt. %, or less than or equal to about 89 wt. %, but no lower than about 1 wt. % based on the total weight of the ready-to-use heat transfer fluid.

In the ready-to-use heat transfer fluid, the non-ionic surfactant-which, at a minimum, includes a copper and copper alloy corrosion inhibitor and a polyalkylene glycol (but which, in some embodiments, may also include one or more additional non-ionic surfactants)—may be present in an amount of about 0.001 wt. % to about 5 wt. % based on the total weight of the ready-to-use heat transfer fluid. Within this range, the non-ionic surfactant may be present in an amount greater than or equal to about 0.005 wt. %, greater than or equal to about 0.01 wt. %, or greater than or equal to about 0.10 wt. % based on the total weight of the ready-to-use heat transfer fluid. Also within this range, the non-ionic surfactant may be present in an amount less than or equal to about 4 wt. %, less than or equal to about 3 wt. %, less than or equal to about 2 wt. %, less than or equal to about 1.5 wt. %, or less than or equal to about 1 wt. % based on the total weight of the ready-to-use heat transfer fluid.

For embodiments in which the heat transfer fluid includes one or more additional low-conductivity corrosion inhibitors, the total amount of the one or more additional low-conductivity corrosion inhibitors may be greater than about 0.001 wt. % based on the total weight of the heat transfer fluid. Within this range, the amount of one or more additional low-conductivity corrosion inhibitors may be less than about 10 wt. %, less than about 9 wt. %, less than about 8 wt. %, less than about 7 wt. %, less than about 6 wt. %, less than about 5 wt. %, less than about 4 wt. %, less than about 3 wt. %, or less than about 2 wt. % based on the total weight of the heat transfer fluid.

For embodiments in which the heat transfer fluid includes one or more additional optional components, the total amount of the one or more additional optional components may be greater than about 0.001 wt. % based on the total weight of the heat transfer fluid. Within this range, the amount of one or more additional optional components may be less than about 20 wt. %, less than about 19 wt. %, less than about 18 wt. %, less than about 17 wt. %, less than about 16 wt. %, less than about 15 wt. %, less than about 14 wt. %, less than about 13 wt. %, or less than about 12 wt. %, less than about 11 wt. %, less than about 10 wt. %, less than about 9 wt. %, less than about 8 wt. %, less than about 7 wt. %, less than about 6 wt. %, less than about 5 wt. %, less than about 4 wt. %, less than about 3 wt. %, or less than about 2 wt. % based on the total weight of the heat transfer fluid.

The pH of the heat transfer fluid may be between about 6.8 and about 10.0 at room temperature. Within this range, the pH may be greater than or equal to about 7.5 or, in some embodiments, greater than or equal to about 7.8. Also within this range, the pH may be less than or equal to about 9.0 or, in some embodiments, less than or equal to about 8.8.

A method of preventing corrosion in a heat transfer system in accordance with the present teachings includes contacting at least a portion of the heat transfer system with a heat transfer fluid of a type described herein. The heat transfer system may include one or a plurality of components containing carbon steel, aluminum, aluminum alloy, magnesium, magnesium alloy, yellow metal, or a combination thereof. In some embodiments, the heat transfer system may include magnesium and/or magnesium alloy. In some embodiments, the heat transfer system includes a fuel cell.

In some embodiments, an ion exchange resin pre-treated with a heat transfer fluid concentrate or heat transfer fluid derived therefrom in accordance with the present teachings may be used to provide corrosion protection. For example, an ion exchange resins (e.g., mixed bed resins or anion exchange resins) may be pre-treated with a heat transfer fluid concentrate or heat transfer fluid derived therefrom containing a 5- or 6-membered heterocyclic ring as the active functional group, wherein the heterocyclic ring contains at least one nitrogen atom (e.g., an azole compound). Then, the ion exchange resins may be packed into a filter installed in a side-stream of the cooling system. Some of the ionic species present in the coolant or generated during operation of the cooling system will exchange with a corrosion inhibitor attached to the exchangeable sites on the ion exchange resins. This exchange leads to the release of the corrosion inhibitor from the resin and removal of the ionic species from the coolant. Since 5- or 6-membered N-heterocyclic compounds used as corrosion inhibitors are weakly ionic compounds, their release at the typically used concentration ranges (e.g., less than a few thousand milligrams per liter) in the coolant may not result in an unacceptable increase in conductivity. Moreover, the amount of inhibitor released from the resin depends on the corrosion protection needs of the coolant. An increase in corrosivity in the coolant may produce more ionic species, which in turn may trigger an increase in the amount of the corrosion inhibitor released from the resin due to the ion exchange mechanism. The increased corrosion inhibitor concentration in the coolant may itself lead to a reduction in corrosion rate. Thus, the mixed bed ion exchange resins may be used to maintain low conductivity in the coolants in the system. In some embodiments, a filter and/or strainer may be used to prevent the leakage of ion exchange resin beads into the system.

Ion exchange resins loaded with corrosion inhibitors in accordance with the present teachings may be prepared by contacting the ion exchange resins with aqueous solutions containing the corrosion inhibitors for a period of time that is sufficient for the corrosion inhibitors to have exchanged 15% or more of the total exchangeable groups in the resins. In other words, in some embodiments, the corrosion inhibitor loading may reach 15% or more of the exchange capacity of the resin. In other embodiments, the corrosion inhibitor loading may be more than 50% of the exchange capacity of the resins. In further embodiments, the corrosion inhibitor loading may be more than 75% of the exchange capacity of the resin. The ion exchange resins loaded with corrosion inhibitors may then be packaged into a filter and placed in the cooling system to provide the desired corrosion protection. Before installation in a cooling system, the ion exchange resins loaded with corrosion inhibitors may be cleaned with de-ionized water and/or cleaned coolant to minimize the possibility of accidental introduction of impurities into the system.

The corrosion inhibitors that can be used in the instant invention to treat the ion exchange resins may have a $pK_a$ value of greater than or equal to about 5 if it is an acid in an aqueous solution at 25° C. If a treatment inhibitor is a base, the $pK_b$ value of suitable treatment inhibitors may be greater than or equal to about 5 in an aqueous solution at 25° C. Representative examples of the ion exchange resin treatment inhibitors include but are not limited to compounds containing a 5- or 6-membered heterocyclic ring as the active functional group, wherein the heterocyclic ring contains at least one nitrogen atom (e.g., an azole compound). In some embodiments, other compounds may be used to treat the ion exchange resins including but not limited to one or more of the corrosion inhibitors described herein.

The ion exchange resins used in accordance with the present teachings depend on the nature of the corrosion inhibitors to be used. For example, if N-heterocyclic compounds are used as the corrosion inhibitors, the ion exchange resin may be regenerable mixed-bed resins or anion exchange resins. If the corrosion inhibitors may become positively charged species in solutions, then regenerable mixed bed resins or cation exchange resins may be used. The mixed bed resin used is a mixture of a cation ion exchange resin and an anion exchange resin. The cation exchange resin used in accordance with the present teachings may be in H$^+$ form, and the anion exchange resin may be in OH— form. An ion exchange resin includes a polymer matrix and the functional groups that interact with the ions. The ion exchanger matrix may be polystyrene, polystyrene and styrene copolymers, polyacrylic, phenol-formaldehyde, polyalkylamine, and/or the like, and combinations thereof. The cation ion exchange resin functional groups may be sulfonic acid groups (—SO$_3$H), phosphonic acid groups (—PO$_3$H), phosphinic acid groups (—PO$_2$H), or carboxylic acid groups (—COOH or —C(CH$_3$)—COOH). The anion ion exchange resin functional groups may be quaternary ammonium groups (e.g., benzyltrimethylammonium groups or benzyldimethylethanolammonium groups) or tertiary amine functional groups. In some embodiments, the ion exchange resins available from Rohm and Haas (e.g., Amberlite, Amberjet, Duolite, and Inac resins), Bayer (Lewatit), Dow (Dowex), Mitsubishi (Diaion), Purolite, Sybron (fonac), Resintech and/or the like may be used in accordance with the present teachings.

Heat transfer fluid concentrates and heat transfer fluids derived therefrom in accordance with the present teachings are further demonstrated by the following non-limiting examples. The following examples illustrate features in accordance with the present teachings, and are provided solely by way of illustration. They are not intended to limit the scope of the appended claims or their equivalents.

EXAMPLES

The materials used in the following examples are summarized in Table 1.

TABLE 1

Materials.

| Component | Description |
| --- | --- |
| Freezing point depressant | Monoethylene glycol, reagent grade (ethylene glycol) |
| Deionized Water | |
| Azole | Cobratec 99 (BZT) (benzotriazole) |
| Sorbitan fatty acid ester | Span 20 (sorbitan monolaurate) |
| Siloxane 1 | Silwet L-7650 (siloxane polyalkyleneoxide copolymer; polyalkyleneoxide modified polydimethylsiloxane) |
| Siloxane 2 | Silwet L-7200 (siloxane polyalkyleneoxide copolymer) |
| Siloxane 3 | Silwet L-7657 (siloxane polyalkyleneoxide copolymer) |
| Polyalkylene glycol | Carbowax 400 (polyethylene glycol, average MW = 380-420 Daltons) |
| Polyglycerol | CAS No. 25618-55-7 (Solvay Chemicals International SA, polyglycerol-3 or polyglycerin-3, 15-30 wt. % diglycerol, 35-55 wt. % triglycerol, 10-25 wt. % tetraglycerol, <10 wt. % pentaglycerol, and <5 wt. % hexaglycerol and higher oligomers) |
| Alkoxylated alcohol 1 | MACOL LF-110 |
| Alkoxylated alcohol 2 | TRITON EF-19 |
| Siloxane antifoam 1 | PC-5450NF (polydimethylsiloxane emulsion based antifoaming agent) |
| Siloxane Antifoam 2 | Y-14865 (GE Silicones, polydimethylsiloxane emulsion based antifoaming agent) |

Example 1—Low-Conductivity Antifreeze/Coolant Formulations

Thirteen heat transfer fluid compositions were prepared as summarized in Tables 2 and 3 below. All amounts are shown in wt. % based on the total weight of the heat transfer fluid. The conductivities of fluid nos. 1-4 are also provided.

TABLE 2

Antifreeze/Coolant Formulation Nos. 1-6.

| Fluid ID<br>Ingredients | Fluid #1<br>wt. % | Fluid #2<br>wt. % | Fluid #3<br>wt. % | Fluid #4<br>wt. % | Fluid #5<br>wt. % | Fluid #6<br>wt. % |
|---|---|---|---|---|---|---|
| Monoethylene glycol, reagent grade | 60 | 59.7192 | 59.7192 | 59.7192 | 59.8331 | 59.7852 |
| Deionized Water | 40 | 39.9760 | 39.9760 | 39.9760 | 39.9520 | 39.9200 |
| Cobratec 99 (BZT) | | 0.0100 | 0.0100 | 0.0100 | 0.0100 | 0.0100 |
| Span 20 | | 0.0600 | | 0.0300 | 0.0600 | 0.1000 |
| Silwet L-7650 | | 0.1999 | 0.1999 | 0.1999 | | |
| Silwet L-7657 | | | | | | |
| Silwet L-7200 | | | | | 0.0499 | 0.0499 |
| Carbowax 400 | | | 0.0600 | 0.0300 | 0.0600 | 0.1000 |
| Polyglycerol | | | | | | |
| Antifoam, PC-5450NF | | 0.0350 | 0.0350 | 0.0350 | 0.0350 | 0.0349 |
| Sum | 100.0000 | 100.0000 | 100.0000 | 100.0000 | 100.0000 | 100.0000 |
| RT Coolant Conductivity (µS/cm) | 0.25 | 0.73 | 0.51 | 0.58 | | |

TABLE 3

Antifreeze/Coolant Formulation Nos. 7-13.

| Fluid ID<br>Ingredients | Fluid #7<br>wt. % | Fluid #8<br>wt. % | Fluid #9<br>wt. % | Fluid #10<br>wt. % | Fluid #11<br>wt. % | Fluid #12<br>wt. % | Fluid #13<br>wt. % |
|---|---|---|---|---|---|---|---|
| Monoethylene glycol, reagent grade | 59.8151 | 59.835 | 59.7854 | 59.7952 | 59.8252 | 59.2949 | 59.2949 |
| Deionized Water | 39.9400 | 40.0000 | 39.9202 | 39.9000 | 39.9200 | 39.5662 | 39.5662 |
| Cobratec 99 (BZT) | 0.0100 | 0.0100 | 0.0100 | 0.0500 | | 0.0250 | 0.0250 |
| Span 20 | 0.0500 | 0.0600 | 0.0998 | 0.1000 | 0.1000 | 0.0600 | 0.0600 |
| Silwet L-7650 | | | | | | | |
| Silwet L-7657 | | | | 0.0200 | 0.0200 | 0.0198 | 0.0198 |
| Silwet L-7200 | 0.0499 | | 0.0499 | | | | |
| Carbowax 400 | 0.10001 | 0.0600 | | 0.1000 | 0.1000 | 0.4998 | |
| Polyglycerol | | | 0.0998 | | | 0.4998 | 0.9996 |
| Antifoam, PC-5450NF | 0.0349 | 0.0350 | 0.0349 | 0.0349 | 0.0349 | 0.0346 | 0.0346 |
| Sum | 100.0000 | 100.0000 | 100.0000 | 100.0000 | 100.0000 | 100.0000 | 100.0000 |
| RT Coolant Conductivity (µS/cm) | | | | | | | |

The compositions were tested according to a modified ASTM D1384. The test results obtained for various metal and metal alloys present in vehicle cooling systems, including metal and metal alloys containing aluminum and magnesium, are summarized in Tables 4 and 5 below. Metal or metal alloy coupons were exposed to each of the heat transfer fluid compositions represented by examples 1-13. The coupons were exposed to each composition for 336 hours and the mass loss for each coupon was obtained. In Tables 4 and 5, the mass loss of each coupon is given as in (mg specimen)/336 hours. The increase in the concentration of magnesium ions ($Mg^{2+}$) for each composition was also measured both before and after conducting the modified ASTM D1384 tests. The $Mg^{2+}$ concentration before and after the corrosion test is given in mg/L for each composition.

TABLE 4

Mass Loss [(mg specimen/336 hours] for Heat Transfer Fluid Nos. 1-6.

| Metal ID | Fluid #1 | Fluid #2 | Fluid #3 | Fluid #4 | Fluid #5 | Fluid #6 |
|---|---|---|---|---|---|---|
| Brass CA 260 | 37.8 | 1.6 | 0.1 | 1.5 | 2.1 | 1.8 |
| Copper | 27.2 | 2.8 | 2.2 | 2.9 | 1.5 | 1.8 |
| SAE1020 Steel | 149.3 | 0.5 | 93.6 | 0.3 | 0.3 | 0.5 |
| Mg AS-21X-1 (un-coupled) | 63.85 | 68.15 | 33.85 | 47.45 | 25.3 | 29.8 |
| Cast Aluminum SAE329 | −0.3 | −3.3 | −2.6 | −4.6 | −2 | −2.1 |
| Aluminum 3003 | 1.9 | −0.5 | 0.4 | −0.1 | 1.1 | 0.2 |
| Mg AS-21X-2 (un-coupled) | 67.05 | 71.65 | 37.65 | 51.05 | 28.8 | 29.4 |
| $Mg^{2+}$ (mg/L) After Test | 159.3 | 134.9 | 71 | 103.9 | 35.2 | 40.5 |
| $Mg^{2+}$ (mg/L) BeforeTest | 0.64 | 0.92 | 0.12 | 0.12 | 0.50 | 0.28 |

TABLE 5

Mass Loss [(mg Specimen/336 hours] for Heat Transfer Fluid Nos. 7-13.

| Metal ID | Fluid #7 | Fluid #8 | Fluid #9 | Fluid #10 | Fluid #11 | Fluid #12 | Fluid #13 |
|---|---|---|---|---|---|---|---|
| Brass CA 260 | 2 | 1.5 | 1.9 | 1.6 | 8.4 | 1.6 | 1.3 |
| Copper | 1.2 | 1.8 | 1.8 | 1 | 7.5 | 0.8 | 1.2 |
| SAE 1020 Steel | 0.7 | 0.5 | 1.2 | -0.5 | -0.3 | -0.2 | -0.3 |
| Mg AS-21X-1 (un-coupled) | 26.6 | 21.5 | 27.9 | 43.85 | 27.95 | 31.95 | 29.15 |
| Cast Aluminum SAE329 | -2.3 | -1.1 | -4.3 | -3.7 | -5 | -1 | -4.8 |
| Aluminum 3003 | 0.2 | 1.4 | 0.8 | 0.8 | -0.5 | 1.3 | 0.7 |
| Mg AS-21X-2 (un-coupled) | 27.5 | 23.5 | 27.7 | 50.85 | 26.05 | 23.65 | 28.05 |
| $Mg^{2+}$ (mg/L) After Test | 36.9 | 24.6 | 39.3 | 59.6 | 60.3 | 38.3 | 36.4 |
| $Mg^{2+}$ (mg/L) BeforeTest | 0.64 | 0.64 | 0.58 | 0.13 | 0.63 | 0.61 | 0.63 |

As shown in Tables 4 and 5, the heat transfer fluids containing an azole compound in combination with a sorbitan fatty acid ester and a polyalkylene glycol (fluid nos. 4-13) exhibit superior corrosion-inhibiting properties for various metal and metal alloys, including ones containing aluminum and magnesium. In particular, these compositions exhibited a significant improvement in magnesium corrosion resistance. Surprisingly and unexpectedly, the magnesium alloy coupons exhibited a mass loss that is smaller than the value specified for aluminum alloy coupons in accordance with ASTM D3306. The composition of example 12 includes polyglycerol, which is an alkoxylated alcohol. The composition of example 12 further exhibits excellent corrosion inhibition for both magnesium- and aluminum-based metal and metal alloys. In addition, example 4 exhibits a low conductivity value making it an excellent composition for use in both internal combustion engine cooling systems and alternative power cooling systems (e.g., fuel cell cooling systems).

Example 2—Effect of Inhibitor Additions

FIG. 1 shows a plot of the effect of inhibitor additions on the corrosion rate of MRI-202S alloy and C1008 steel. At time "A," 0.6 grams of TRITON EF-19 were added. At time "B," 0.04 grams of benzotriazole were added. At times "C" and "D," 0.12 grams of SPAN 20 were added. At times "E" and "F," 0.12 grams of CARBOWAX PEG 400 were added. At time "G," 0.24 grams of CARBOWAX PEG 400 were added. At time "H," 0.24 grams of SPAN 20 were added. At time "I," 1 gram of DOWEX monosphere MR-450UPW mix resin and 0.1237 grams of benzotriazole were added.

Figure 2:
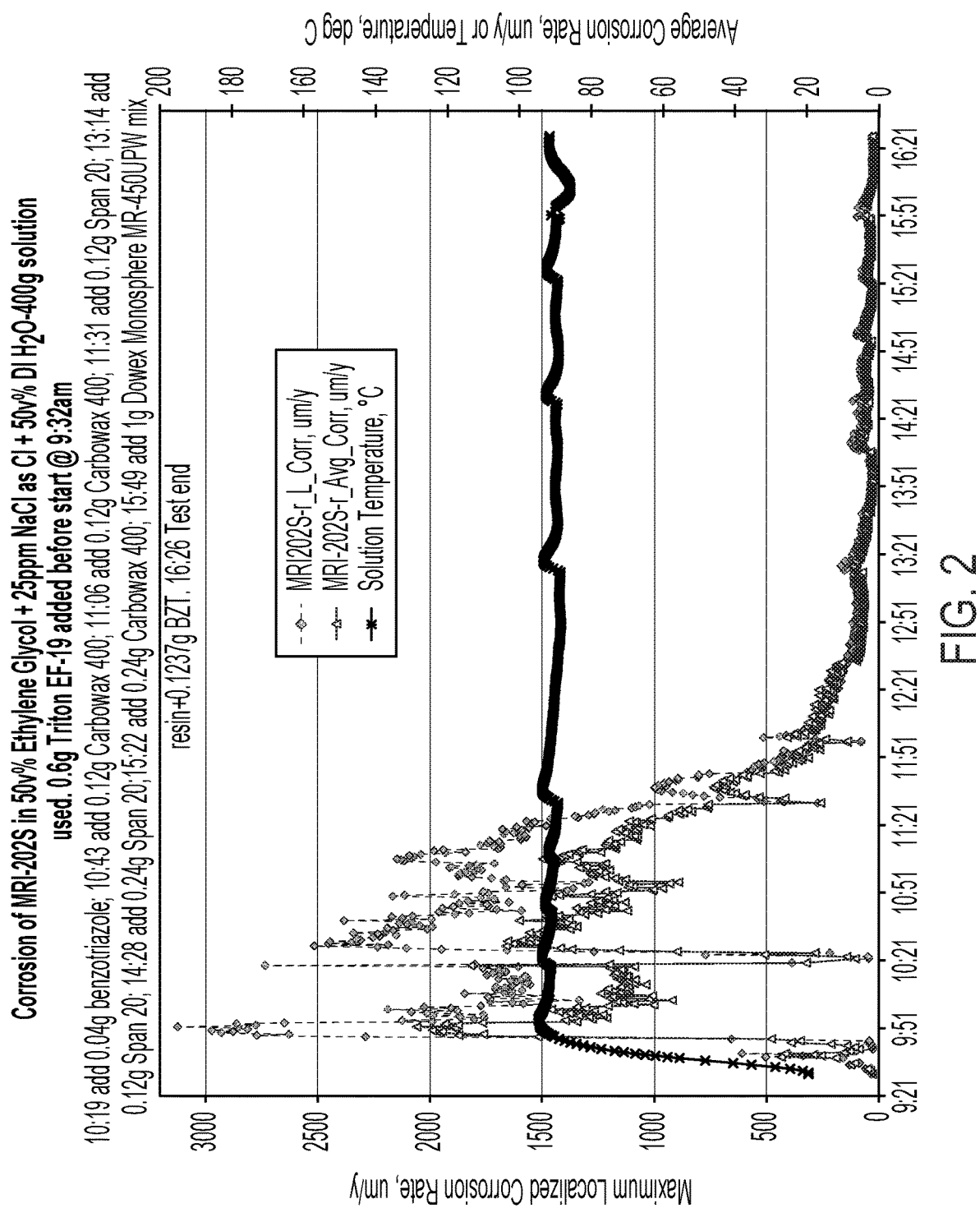
FIG. 2 shows a plot of average corrosion rate versus time in a first example demonstrating the effect of corrosion inhibitor additions.

FIG. 2 shows a plot of the effect of inhibitor additions on the maximum localized corrosion rate of MRI-202S alloy. Prior to start, 0.6 grams of TRITON EF-19 were added. At the times shown in FIG. 2, sequential additions were made of the following ingredients: (a) 0.04 grams benzotriazole, (b) 0.12 grams CARBOWAX 400, (c) 0.12 grams CARBOWAX 400, (d) 0.12 grams SPAN 20, (e) 0.12 grams SPAN 20, (f) 0.24 grams SPAN 20, (g) 0.24 grams CARBOWAX 400, and (h) 1 gram of DOWEX monosphere MR-450UPW mix resin and 0.1237 grams of benzotriazole.

Figure 3:
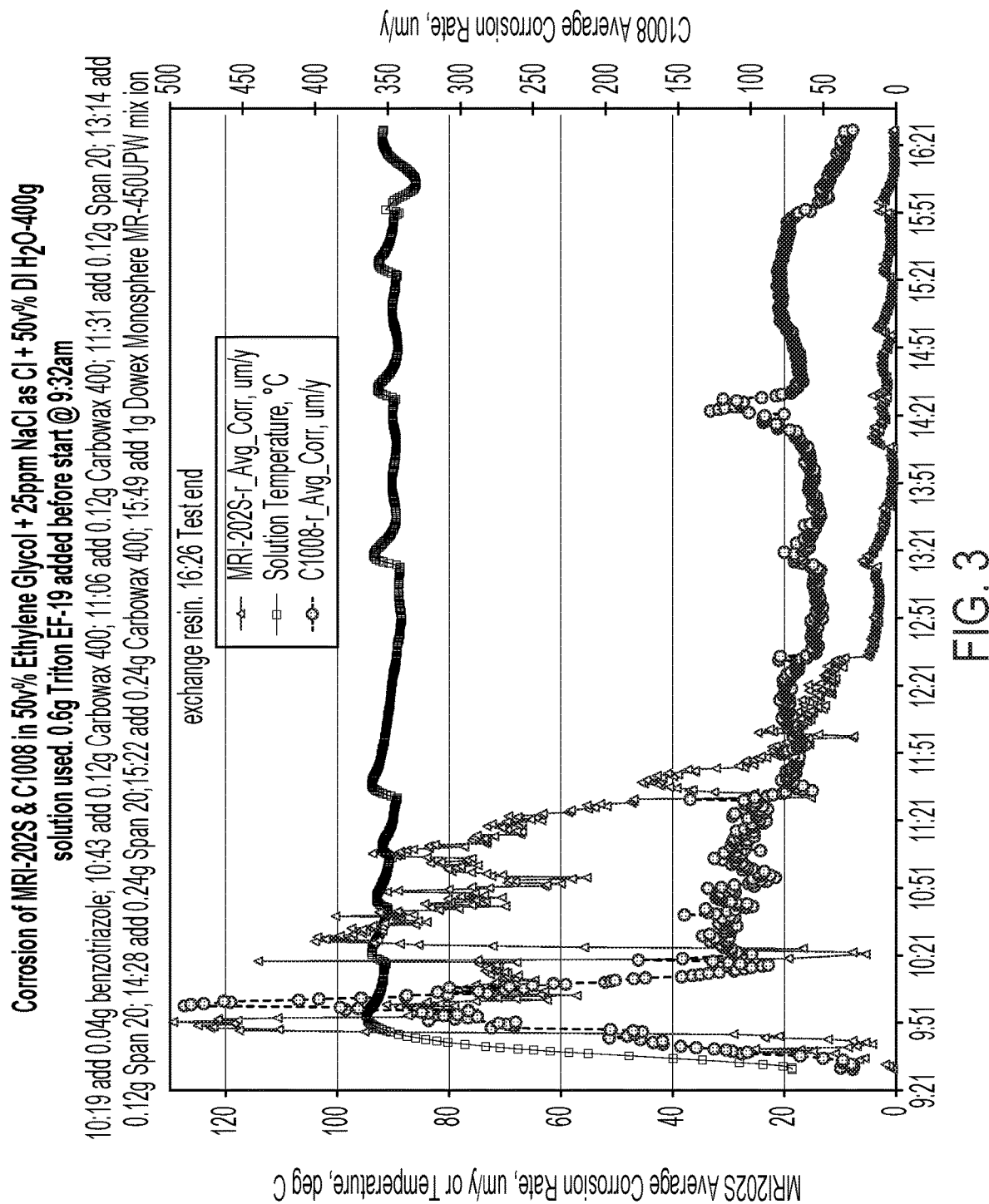
FIG. 3 shows a plot of average corrosion rate versus time in a first example demonstrating the effect of corrosion inhibitor additions.

FIG. 3 shows a plot of the effect of inhibitor additions on the average corrosion rate of MRI-202S alloy and C1008 steel. Prior to start, 0.6 grams of TRITON EF-19 were added. At the times shown in FIG. 3, sequential additions were made of the following ingredients: (a) 0.04 grams benzotriazole, (b) 0.12 grams CARBOWAX 400, (c) 0.12 grams CARBOWAX 400, (d) 0.12 grams SPAN 20, (e) 0.12 grams SPAN 20, (f) 0.24 grams SPAN 20, (g) 0.24 grams CARBOWAX 400, and (h) 1 gram of DOWEX monosphere MR-450UPW mix ion exchange resin.

Example 3—Additional Heat Transfer Fluid Compositions

Four additional heat transfer fluid compositions A-D were prepared as summarized in Tables 6 below. All amounts are shown in wt. % based on the total weight of the heat transfer fluid. The conductivities of fluids A-D are also provided.

TABLE 6

Heat Transfer Fluids A-D.

| Fluid ID Ingredients | Fluid A wt. % | Fluid B wt. % | Fluid C wt. % | Fluid D wt. % |
|---|---|---|---|---|
| Monoethylene glycol, reagent grade | 49.7535 | 50.0000 | 50.0000 | 50.0000 |
| Deionized Water | 50.0015 | 49.8350 | 49.7200 | 49.7200 |
| Cobratec 99 (BZT) | 0.0100 | 0.0100 | 0.0100 | 0.0100 |
| Span 20 or Sorbitan laurate | | 0.0600 | 0.0600 | 0.0600 |
| Silwet L-7650 | | | | |
| Silwet L-7200 | 0.2000 | | | |
| Carbowax 400 | | 0.0600 | 0.0600 | 0.0600 |
| Polyglycerol | | | | |
| Macol LF-110 | | | 0.1500 | |
| Triton EF-19 | | | | 0.1500 |
| Antifoam Y-14865 | | 0.0350 | | |
| Antifoam, PC-5450NF | 0.0350 | | | |
| Sum | 100.0000 | 100.0000 | 100.0000 | 100.0000 |
| RT Coolant Conductivity (uS/cm) | 0.62 | 1.10 | 0.89 | 1.26 |

The test results obtained for various metal and metal alloys present in vehicle cooling systems, including metal and metal alloys containing aluminum, are summarized in Table 7 below. Metal or metal alloy coupons were exposed to each of the heat transfer fluid compositions represented by Examples A-D. However, the compositions of Examples B-D were evaluated in a cooling system that further comprised a mixed bed ion exchange deionizer. The deionizer used in Examples B and C includes a wet mixed resin 2272-157 treated with 4 g of azole. The deionizer used in Example D includes 4 g of dry Dowex MR-450UPW. The coupons were exposed to each composition for 336 hours and the mass loss for each coupon was obtained. Table 7 illustrates the mass loss of each coupon in (mg specimen)/336 hours. The increase in the concentration of magnesium ions ($Mg^{2+}$) was also measured for each composition both before and after conducting the modified ASTM D1384 tests. The $Mg^{2+}$ concentration both before and after the corrosion test is given in mg/L for each composition.

TABLE 7

Mass Loss [(mg specimen/336 hours] for Heat Transfer Fluids A-D.

| Metal ID | Fluid A | Fluid B | Fluid B | Fluid C | Fluid D |
|---|---|---|---|---|---|
| Brass CA 260 | 2.7 | 2.0 | 3.1 | 5.1 | 3.4 |
| Carbon Steel, UNS G10200 | | | 0.8 | | |
| Stainless Steel 316 | 0.2 | 0.0 | 0.7 | 0 | 0 |
| Aluminum 3003 | −0.4 | −0.3 | −0.3 | 0.3 | 0.6 |
| Aluminum 6061 | −0.2 | −0.5 | −0.7 | 0.1 | 1 |
| Cast Aluminum SAE329 | −3.2 | −5.7 | −3.5 | −3.6 | −1.3 |
| Mixed Bed Ion Exchange Resin Used | | 4 g BZT treated wet mixed resin 2272-157 | 4 g BZT treated wet mixed resin 2272-157 | 4 g BZT treated wet mixed resin 2272-157 | 4 g dry Dowex MR-450UPW |

Table 7 shows the advantage of using a mixed bed ion exchange deionizer with a heat transfer fluid composition in accordance with the present teachings. As shown in Table 6, the heat transfer fluids containing an azole compound in combination with a sorbitan fatty acid ester and polyalkylene glycol (Examples 4-13) exhibit superior corrosion inhibiting properties for various aluminum and aluminum alloys when used in combination with a mixed bed ion exchange deionizer. In addition, these compositions exhibited a significant improvement in magnesium corrosion resistance. The compositions of example C and D further include alkoxylated alcohols. Each of the compositions in examples B-D exhibited a low conductivity value making each of the compositions appropriate for use in both internal combustion engine cooling systems and alternative power cooling systems, such as fuel cells cooling systems.

Example 4—Additional Heat Transfer Fluid Compositions

Two additional heat transfer fluid composition nos. 14 and 15 were prepared as summarized in Tables 8 below. All amounts are shown in wt. % based on the total weight of the heat transfer fluid. The conductivities of fluid no. 14 and 15 are also provided.

TABLE 8

Heat Transfer Fluid Nos. 14 and 15.

| Fluid ID Ingredients | Fluid #14 wt. % | Fluid #15 wt. % |
|---|---|---|
| Monoethylene glycol, reagent grade | 60.0000 | 60.0000 |
| Deionized Water | 39.7200 | 39.7200 |
| Cobratec 99 (BZT) | 0.0100 | 0.0100 |
| Span 20 (sorbitan laurate) | 0.0600 | |
| Carbowax 400 | 0.0600 | 0.1200 |
| Triton EF-19 | 0.1500 | 0.1500 |
| Sum | 100.0000 | 100.0000 |
| RT Coolant Conductivity (uS/cm) | 0.63 | 0.50 |

The compositions were tested according to a modified ASTM D1384. The test results obtained for various metal and metal alloys present in vehicle cooling systems, including metal and metal alloys containing aluminum and magnesium, are summarized in Table 9 below. Metal or metal alloy coupons were exposed to each of the heat transfer fluid compositions represented by examples 14 and 15. The coupons were exposed to each composition for 336 hours and the mass loss for each coupon was obtained. In Table 9, the mass loss of each coupon is given as in (mg specimen)/336 hours. The increase in the concentration of magnesium ions ($Mg^{2+}$) for each composition was also measured both before and after conducting the modified ASTM D1384 tests. The $Mg^{2+}$ concentration before and after the corrosion test is given in mg/L for each composition.

TABLE 9

Mass Loss [(mg specimen/336 hours] for Heat Transfer Fluids 14-15.

| Metal ID | Fluid #14 | Fluid #14 | Fluid #14 | Fluid #15 |
|---|---|---|---|---|
| Brass CA 260 | 1.9 | 2.5 | 1.9 | 2.2 |
| Copper | 1.1 | | | |
| SAE 1020 Steel | 0.0 | 0.2 | 0.3 | 1.8 |
| Mg AXJ-530 (coupled to c-steel SAE1020 via an Al6061 spacer) | | 30.15 | 19.35 | 18.95 |
| Mg AXJ-530 (un-coupled) | 15.25 | | | |
| Mg AXJ-530 (coupled to C-Al SAE329 via an Al6061 spacer) | | 24.15 | 20.95 | 11.55 |
| Cast Aluminum SAE329 | −2.4 | −0.6 | 3.3 | 0.2 |
| Aluminum 3003 | −0.1 | 0.7 | 0.9 | 1.2 |
| Mg AXJ-530 (un-coupled) | 15.65 | 12.75 | 11.55 | 3.05 |
| Presence of Mixed Bed IX-Resin | No | No | 4 g Dow MR-450 UPW | No |
| $Mg^{2+}$ (mg/L) After Test | 33.8 | 62.8 | 4.53 | 19.0 |
| $Mg^{2+}$ (mg/L) Initial, Before Test | 1.61 | 1.61 | 1.61 | 2.15 |

Table 9 shows that a heat transfer fluid that further includes sorbitan fatty acid ester (example 14) shows excellent corrosion inhibiting properties for both aluminum- and magnesium-based metals and metal alloys, especially when used in combination with a mixed bed ion exchange deionizer. The composition of example 14 further exhibits a low conductivity value making each of the compositions appropriate for use in both internal combustion engine cooling systems and alternative power cooling systems, such as fuel cells cooling systems.

Example 5—Foaming Analysis

Table 10 shows that heat transfer compositions in accordance with the present teachings show excellent results when further subjected to foaming tests. Examples C and D were each subjected to Nummi and ASTM D1881 foaming tests both before and after being subjected to the ASTM D1384 corrosion test. As shown in Table 10, compositions in accordance with the present teachings yield foaming test results-both before and after the corrosion test is performed—that are in compliance with ASTM D3306 specifications and the requirements specified by vehicle manufacturers for both internal combustion and alternative power source applications.

TABLE 10

Foam Test Results for Heat Transfer Fluids C and D.

| Fluid ID | Nummi Foam Test Results Before 1384 | Nummi Foam Test Results-after D1384 |
|---|---|---|
| Fluid #c | 3 mL | 5 mL |
| Fluid #d | 0 mL | 0 mL |
| Fluid ID | D1881 Results Before 1384 | D1881Results After D1384 |

TABLE 10-continued

Foam Test Results for Heat Transfer Fluids C and D.

| Fluid ID | Nummi Foam Test Results Before 1384 | Nummi Foam Test Results-after D1384 |
|---|---|---|
| Fluid #c | 30 mL/1.1 sec | |
| Fluid #d | 60 mL/2.0 sec | 85 ml/2.5sec |

Example 6—Additional Antifreeze/Coolant Formulations

Six additional heat transfer fluid compositions 16-21 were prepared as summarized in Table 11 below. All amounts are shown in wt. % based on the total weight of the heat transfer fluid.

TABLE 11

Antifreeze/Coolant Formulation Nos. 16-21.

| Fluid ID Ingredients | Fluid #16 wt. % | Fluid #17 wt. % | Fluid #18 wt. % | Fluid #19 wt. % | Fluid #20 wt. % | Fluid #21 wt. % |
|---|---|---|---|---|---|---|
| Ethylene glycol, Antifreeze grade | 100.0000 | | | | 99.5700 | |
| 1,2-Propylene Glycol, PG, Antifreeze grade | | 100.0000 | 99.7780 | 99.7183 | | |
| 1,3-Propanediol | | | | | | 99.5700 |
| Benzotriazole, Cobratec 99 | | | 0.0100 | 0.0100 | 0.0100 | 0.0100 |
| Span 20 (sorbitan laurate, Sorbitan monododecanoate), CAS no. 1338-39-2 | | | 0.0299 | 0.0598 | 0.0600 | 0.0600 |
| Carbowax 400 | | | 0.0299 | 0.0598 | 0.0600 | 0.0600 |
| Liquitint Blue EA | | | 0.0025 | 0.0025 | | |
| Triton EF-19 | | | 0.1497 | 0.1496 | 0.3000 | 0.3000 |
| Sum | 100.0000 | 100.0000 | 100.0000 | 100.0000 | 100.0000 | 100.0000 |
| Brief Description of Fluid | EG | PG | PG/300SPAN20/ 300CARBOWAX400/ 100BZT | PG/600SPAN20/ 600CARBOWAX400/ 100BZT | EG/600SPAN20/ 600Carboxwax400/ 100BZT | PDO/600SPAN20/ 600CARBOWAX400/ 100BZT |

The compositions were tested according to a modified ASTM D4340. The test results obtained for various metal and metal alloys present in vehicle cooling systems, including metal and metal alloys containing aluminum and magnesium, are summarized in Table 12 below. Metal or metal alloy coupons were exposed to each of the heat transfer fluid compositions represented by examples 16-21. The coupons were exposed to each composition for 168 hours and the mass loss for each coupon was obtained. In Table 12, the mass loss of each coupon is given as in (mg specimen)/168 hours. The increase in the concentration of magnesium ions ($Mg^{2+}$) for each composition was also measured both before and after conducting the modified ASTM D4340 tests. The $Mg^{2+}$ concentration before and after the corrosion test is given in mg/L for each composition.

TABLE 12

Mass Loss [(mg specimen/168 hours] for Heat Transfer Fluid Nos. 16-21.

| Metal ID | Comparison #1 100% A | Comparison #2 100% B | Example 1 100% C | Example 2 100% D | Example 3 100% H | Example 4 100% I |
|---|---|---|---|---|---|---|
| High Temperature, Creep Resistance Mg alloy: water washed | 1.15 | 2.46 | 0.02 | 0.01 | 0.90 | 0.59 |
| $Mg^{2+}$ (mg/L) Initial | <2.0 | <2.0 | <2.0 | <2.0 | <2.0 | <2.0 |
| $Mg^{2+}$ (mg/L) After Test | 76 | 160 | <2.0 | <2.0 | 67 | 29 |
| Post Test Sample Visual Appearance | Corroded, Darkened | Corroded, Pitted | No Corrosion | No Corrosion | Darkened | Darkened |

The entire contents of each and every patent and non-patent publication cited herein are hereby incorporated by reference, except that in the event of any inconsistent disclosure or definition from the present specification, the disclosure or definition herein shall be deemed to prevail.

It is to be understood that use of the indefinite articles "a" and "an" in reference to an element (e.g., "a freezing point depressant," "a non-ionic surfactant," "a polyalkylene glycol," etc.) does not exclude the presence, in some embodiments, of a plurality of such elements.

The foregoing detailed description has been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A heat transfer fluid concentrate comprising:
a freezing point depressant; and
a non-ionic surfactant comprising (i) a corrosion inhibitor for copper and copper alloys and (ii) a polyalkylene glycol;
wherein a conductivity of the heat transfer fluid concentrate is less than or equal to about 100 μS/cm and wherein the heat transfer fluid concentrate is free of siloxane-polyether copolymers.

2. The heat transfer fluid concentrate of claim 1 wherein the conductivity of the heat transfer fluid concentrate is less than or equal to about 25 μS/cm.

3. The heat transfer fluid concentrate of claim 1 wherein the conductivity of the heat transfer fluid concentrate is less than or equal to about 10 μS/cm.

4. The heat transfer fluid concentrate of claim 1 wherein the freezing point depressant comprises an alcohol.

5. The heat transfer fluid concentrate of claim 1 wherein the freezing point depressant comprises ethylene glycol, 1,2-propylene glycol, 1,3-propanediol, or a combination thereof.

6. The heat transfer fluid concentrate of claim 1 wherein the freezing point depressant is present in an amount of about 10 wt. % to about 99.85 wt. % based on a total weight of the heat transfer fluid concentrate.

7. The heat transfer fluid concentrate of claim 1 wherein the freezing point depressant is present in an amount of about 30 wt. % to about 99.5 wt. % based on a total weight of the heat transfer fluid concentrate.

8. The heat transfer fluid concentrate of claim 1 wherein the freezing point depressant is present in an amount of about 40 wt. % to about 99 wt. % based on a total weight of the heat transfer fluid concentrate.

9. The heat transfer fluid concentrate of claim 1 wherein the corrosion inhibitor for copper and copper alloys comprises an azole compound.

10. The heat transfer fluid concentrate of claim 9 wherein the azole compound is selected from the group consisting of an optionally substituted benzotriazole, an optionally substituted tolyltriazole, an optionally substituted $C_2$-$C_{20}$ alkyl benzotriazole, an optionally substituted mercaptobenzothiazole, an optionally substituted thiazole, an optionally substituted imidazole, an optionally substituted benzimidazole, an optionally substituted indazole, an optionally substituted tetrazole, and a combination thereof.

11. The heat transfer fluid concentrate of claim 10 wherein the optionally substituted $C_2$-$C_{20}$ alkyl benzotriazole comprises a methyl benzotriazole, a butyl benzotriazole, or a combination thereof.

12. The heat transfer fluid concentrate of claim 1 wherein the corrosion inhibitor for copper and copper alloys is present in an amount of about 0.01 wt. % to about 4 wt. % based on a total weight of the heat transfer fluid concentrate.

13. The heat transfer fluid concentrate of claim 1 wherein the polyalkylene glycol comprises a polyethylene glycol, a polypropylene glycol, a methoxypolyethylene glycol, or a combination thereof.

14. The heat transfer fluid concentrate of claim 1 wherein the non-ionic surfactant is present in an amount of about 0.001 wt. % to about 2 wt. % based on a total weight of the heat transfer fluid concentrate.

15. The heat transfer fluid concentrate of claim 1 wherein the non-ionic surfactant is present in an amount of about 0.005 wt. % to about 1 wt. % based on a total weight of the heat transfer fluid concentrate.

16. The heat transfer fluid concentrate of claim 1 wherein the non-ionic surfactant is present in an amount of about 0.01 wt. % to about 0.5 wt. % based on a total weight of the heat transfer fluid concentrate.

17. The heat transfer fluid concentrate of claim 1 further comprising an additional non-ionic surfactant.

18. The heat transfer fluid concentrate of claim 17 wherein the additional non-ionic surfactant is selected from the group consisting of a sorbitan fatty acid ester, an alkoxylated alcohol, a polyalkylene glycol ester, a copolymer of ethylene oxide and propylene oxide, a polyoxyalkylene derivative of a sorbitan fatty acid ester, and a combination thereof.

19. The heat transfer fluid concentrate of claim 18 wherein the alkoxylated alcohol has a formula $$RO(CH_2CH_2O)_j(CH_2CH_2CH_2O)_kH,$$

wherein R is a $C_4$-$C_{25}$ linear primary alcohol, j is an integer from 0 to 15, k is an integer from 0 to 15, and j+k is an integer greater than or equal to 1.

20. The heat transfer fluid concentrate of claim 19 wherein R is a $C_6$-$C_{15}$ linear primary alcohol.

21. The heat transfer fluid concentrate of claim 18 wherein the alkoxylated alcohol comprises an ethoxylated alcohol, a propoxylated alcohol, or a combination thereof.

22. The heat transfer fluid concentrate of claim 21 wherein the ethoxylated alcohol has a formula $$RO(CH_2CH_2O)_nH,$$

wherein R is a is a $C_4$-$C_{25}$ linear primary alcohol, and n is an integer from 1 to 15.

23. The heat transfer fluid concentrate of claim 22 wherein R is a $C_6$-$C_{15}$ linear primary alcohol.

24. The heat transfer fluid concentrate of claim 21 wherein the propoxylated alcohol has a formula $$RO(CH_2CH_2CH_2O)_mH,$$

wherein R is a $C_4$-$C_{25}$ linear primary alcohol, and m is an integer from 1 to 15.

25. The heat transfer fluid concentrate of claim 24 wherein R is a $C_6$-$C_{15}$ linear primary alcohol.

26. The heat transfer fluid concentrate of claim 18 wherein the alkoxylated alcohol is present in an amount of about 0.001 wt. % to about 1 wt. % based on a total weight of the heat transfer fluid concentrate.

27. The heat transfer fluid concentrate of claim 17 wherein the additional non-ionic surfactant comprises a sorbitan fatty acid ester and an alkoxylated alcohol.

28. The heat transfer fluid concentrate of claim 1 further comprising a low-conductivity corrosion inhibitor selected from the group consisting of a colloidal silica, an amine salt of a cyclohexenic carboxylate, an amine compound, or a combination thereof.

29. The heat transfer fluid concentrate of claim 1 further comprising water.

30. The heat transfer fluid concentrate of claim 29 wherein the water is deionized water, demineralized water, softened water, or a combination thereof.

31. The heat transfer fluid concentrate of claim 29 wherein the water is present in an amount of about 0.1 wt. % to about 90 wt. % based on a total weight of the heat transfer fluid concentrate.

32. The heat transfer fluid concentrate of claim 29 wherein the water is present in an amount of about 0.5 wt. % to about 70 wt. % based on a total weight of the heat transfer fluid concentrate.

33. The heat transfer fluid concentrate of claim 29 wherein the water is present in an amount of about 1 wt. % to about 60 wt. % based on a total weight of the heat transfer fluid concentrate.

34. The heat transfer fluid of claim 1 further comprising an additional component selected from the group consisting of a $C_1$-$C_{20}$ tetraalkylorthosilicate ester, a colorant, a wetting agent, a biocide, an antifoaming agent, a surfactant, an additional corrosion inhibitor, a non-ionic dispersant, and a combination thereof.

35. A heat transfer fluid comprising:
water;
a freezing point depressant in an amount of about 10 wt. % to about 99.85 wt. % based on a total weight of the heat transfer fluid;
a non-ionic surfactant in an amount of about 0.001 wt. % to about 2 wt. % based on a total weight of the heat transfer fluid, the non-ionic surfactant comprising (i) an azole compound and (ii) a polyalkylene glycol;
wherein a conductivity of the heat transfer fluid concentrate is less than or equal to about 50 μS/cm and wherein the heat transfer fluid concentrate is free of siloxane-polyether copolymers.

36. The heat transfer fluid of claim 35 wherein the freezing point depressant comprises ethylene glycol, 1,2-propylene glycol, 1,3-propanediol, or a combination thereof.

37. The heat transfer fluid concentrate of claim 35 wherein the polyalkylene glycol comprises a polyethylene glycol, a polypropylene glycol, a methoxypolyethylene glycol, or a combination thereof.

38. The heat transfer fluid of claim 35 wherein the azole compound is selected from the group consisting of an optionally substituted benzotriazole, an optionally substituted tolyltriazole, an optionally substituted $C_2$-$C_{20}$ alkyl benzotriazole, an optionally substituted mercaptobenzothiazole, an optionally substituted thiazole, an optionally substituted imidazole, an optionally substituted benzimidazole, an optionally substituted indazole, an optionally substituted tetrazole, and a combination thereof.

39. The heat transfer fluid of claim 35 further comprising an additional non-ionic surfactant is selected from the group consisting of a sorbitan fatty acid ester, an alkoxylated alcohol, a polyalkylene glycol ester, a copolymer of ethylene oxide and propylene oxide, a polyoxyalkylene derivative of a sorbitan fatty acid ester, and a combination thereof.

40. The heat transfer fluid of claim 35 further comprising a low-conductivity corrosion inhibitor selected from the group consisting of a colloidal silica, an amine salt of a cyclohexenic carboxylate, an amine compound, or a combination thereof.

41. The heat transfer fluid of claim 35 further comprising an additional component selected from the group consisting of a $C_1$-$C_{20}$ tetraalkylorthosilicate ester, a colorant, a wetting agent, a biocide, an antifoaming agent, a surfactant, an additional corrosion inhibitor, a non-ionic dispersant, and a combination thereof.

42. A method of preventing corrosion in a heat transfer system, the method comprising:
contacting at least a portion of the heat transfer system with a heat transfer fluid;
wherein the heat transfer fluid comprises:
a freezing point depressant;
water; and
a non-ionic surfactant comprising (i) a corrosion inhibitor for copper and copper alloys and (ii) a polyalkylene glycol;
wherein a conductivity of the heat transfer fluid is less than or equal to about 100 μS/cm and wherein the heat transfer fluid concentrate is free of siloxane-polyether copolymers.

43. The method of claim 42 wherein the heat transfer system comprises a component comprising carbon steel, aluminum, aluminum alloy, magnesium, magnesium alloy, yellow metal, or a combination thereof.

44. The method of claim 42 wherein the heat transfer system comprises a component comprising magnesium, magnesium alloy, or a combination thereof.

45. The method of claim 42 wherein the heat transfer system comprises a fuel cell.

* * * * *